United States Patent
Huang et al.

(10) Patent No.: US 10,827,104 B2
(45) Date of Patent: Nov. 3, 2020

(54) MULTI-LENS CAMERA MODULE

(71) Applicant: PowerGate Optical Inc., Zhubei (TW)

(72) Inventors: Ying Chun Huang, Hsinchu (TW); Yu Chia Chen, Hsinchu (TW); Hsieh Jen Chuang, Hsinchu (TW); Te Pao Ho, Hsinchu (TW)

(73) Assignee: PowerGate Optical Inc. (TW)

( * ) Notice: Subject to any disclaimer, the term of this patent is extended or adjusted under 35 U.S.C. 154(b) by 0 days.

(21) Appl. No.: 16/358,108

(22) Filed: Mar. 19, 2019

(65) Prior Publication Data

US 2019/0297235 A1 Sep. 26, 2019

(30) Foreign Application Priority Data

Mar. 20, 2018 (TW) .............................. 107109462 A
Dec. 21, 2018 (TW) .............................. 107146509 A

(51) Int. Cl.
*H04N 5/225* (2006.01)
*G02B 7/02* (2006.01)
*G03B 21/14* (2006.01)
*G03B 21/43* (2006.01)

(52) U.S. Cl.
CPC .......... *H04N 5/2254* (2013.01); *G02B 7/021* (2013.01); *G03B 21/142* (2013.01); *G03B 21/145* (2013.01); *G03B 21/43* (2013.01)

(58) Field of Classification Search
CPC ........ G02B 27/646; G02B 7/021; G02B 7/08; G03B 21/142; G03B 21/145; G03B 21/43; H02K 41/0356; H04N 5/2254; H04N 5/2257; H04N 5/2258; H04N 5/23287

See application file for complete search history.

(56) References Cited

U.S. PATENT DOCUMENTS

| | | | |
|---|---|---|---|
| 2014/0340774 A1* | 11/2014 | Uno ...................... | H04N 5/238 359/823 |
| 2017/0289457 A1* | 10/2017 | Hu ........................ | G02B 27/646 |
| 2017/0315376 A1* | 11/2017 | Hu .......................... | G02B 7/09 |
| 2018/0100984 A1* | 4/2018 | Wu ......................... | G02B 7/04 |
| 2018/0224631 A1* | 8/2018 | Ichihashi ............. | H04N 5/2253 |
| 2020/0089020 A1* | 3/2020 | Lee .................... | H04N 5/23248 |

* cited by examiner

*Primary Examiner* — Amy R Hsu

(57) ABSTRACT

A multi-lens camera module comprises at least two lens modules located side-by-side. Each lens module can be a voice coil motor (VCM) lens module having an auto-focusing (AF) or/and an optical image stabilizer (OIS) functions. The surface where two lens modules are adjacent with is called the neighbouring surface. A projection view on the neighbouring surface of a plurality of secondary driving magnets of these lens modules located at two sides of the neighbouring surface includes at least one secondary driving magnet which has two opposite edges with unequal length; in addition, shapes of these two opposite edges include at least one of the following: slope, arc and straight line. These secondary driving magnets are arranged across the neighbouring surface in a staggered manner.

19 Claims, 36 Drawing Sheets

MULTI-LENS CAMERA MODULE

BACKGROUND OF INVENTION

1. Field of the Invention

The invention is referring to a multi-lens camera module, especially to a multi-lens camera module having Auto Focusing (AF) Voice Coil Motor (VCM) or Optical Image Stabilizer (OIS) for electronic devices.

2. Description of the Prior Art

In the slim design of smart phones, the internal Central Processing Unit (CPU), memory and battery module have occupied most of the space, therefore the size of camera module is limited. Another trend of design for smart phones of various brands is to furnish multi-lens camera module inside the smart phone, and moreover, camera module equipped with OIS has become a standard equipment in flagship smart phones.

OIS is the abbreviation of Optical Image Stabilizer system, which uses a gyroscope to sense the directions and offsets of shakings, and the system analyses and predicts the image deviations based on the data sensed by the gyroscope. And then, the system controls the lens to make a corresponding horizontal displacement relative to the image sensor, thereby offsetting the offsets, ensuring that the camera remains stable in the hand-shaking conditions.

On the basis of the development of multi-lens camera module and the limitation of the internal space of smart phones, the problem of magnetic interference occurred between two adjacent lens modules needs to be solved. In a camera module having both OIS and AF VCM, the OIS architecture shares the driving magnets with the traditional AF VCM. Which means, the shared driving magnets not only interact with the driving coil of VCM to drive the lens in the Z-axis direction, but also interact with the horizontal coils of OIS to produce pushing forces along the X-axis and Y-axis directions. In order to reduce magnetic interference, conventional way is to directly reduce the size of driving magnets which are located at the adjacent side of two adjacent lens modules due to limited space inside the smart phone. Although the magnetic interference is reduced with smaller driving magnets, however, the pushing (driving) forces, especially the horizontal pushing forces, are also reduced, which inevitably results in lower performances and higher power consumptions of OIS and AF VCM. Miniaturized multi-lens camera module having OIS with sufficient driving forces is necessary, therefore, how to implement the multi-lens camera module with low magnetic interference in the limited space is the goal of various manufacturers.

SUMMARY OF THE INVENTION

The invention relates to a multi-lens camera module which can simply decrease magnetic interference without the need of complicate structural design. No matter the camera module is equipped with traditional VCM AF or OIS or both, the invention uses the characteristic configuration of the magnetic field of lens driving device to reduce magnetic interference between the magnetic fields of two adjacent lens modules. Such that, the unstable offsets of optical axes of two adjacent lens modules due to the magnetic interference can be reduced, the stability when adjusting the lens module can be increased, the distance between two adjacent lens modules can be shortened, the space required for furnishing the multi-lens camera module inside the smart phone can be efficiently configured, and better magnetic interference performance at the same power consumption can be obtained.

In order to achieve aforesaid objective, the present invention provides a multi-lens camera module comprising at least a first lens module and a second lens module adjacent to the first lens module; there being a gap between the first lens module and the second lens module; a center of the distance of the gap being called as a neighbouring surface; the first lens module and the second lens module being located at two sides of the neighbouring surface; each of the first lens module and the second lens module respectively having an optical axis and being defined with an X-axis, a Y-axis and a Z-axis; the optical axis being parallel to the Z-axis; the X-axis, the Y-axis and the Z-axis being perpendicular to each other; the neighbouring surface being parallel to a plane defined by the Y-axis and the Z-axis; wherein, the first lens module and the second lens modules each comprises:

a cover;

a frame, located in the cover and forming an inner compartment therein;

a lens, furnished in the inner compartment of the frame;

a first driving system, comprising a driving coil and a plurality of driving magnets; wherein the driving coil is wound around an outer periphery of the lens and is corresponding to the driving magnets mounted on the frame to provide driving forces along the Z-axis;

wherein, the plurality of driving magnets of the first lens module comprises two primary driving magnets opposite to each other; the plurality of driving magnets of the second lens module comprises two primary driving magnets opposite to each other and at least one secondary driving magnet; the size of the secondary driving magnet is smaller than the primary driving magnet of the second lens module; in addition, a side of the second lens module nearby the neighbouring surface is furnished with the secondary driving magnet, while a side of the first lens module nearby the neighbouring surface is not furnished with the primary driving magnet of the first lens module.

In a preferred embodiment, the plurality of driving magnets of the first lens module further comprises at least one secondary driving magnet; in addition, each one of the first lens module and the second lens module has at least one of the secondary driving magnet located at the side nearby the neighbouring surface; each said secondary driving magnet has a central axis parallel to the optical axis, and there is a distance between two of said central axes;

the secondary driving magnets are arranged across the neighbouring surface along the Y-axis in a staggered manner;

a projection on the neighbouring surface of said secondary driving magnets located nearby the neighbouring surface includes at least one said secondary driving magnet which has unequal lengths of two opposite edges along either the Y-axis or the Z-axis.

In a preferred embodiment, at least one of the first lens module and the second lens module further comprises a second driving system; said second driving system comprises:

a circuit board, said circuit board being furnished with at least two horizontal coils which are corresponding to the driving magnets for providing horizontal pushing forces;

a plurality of suspension wires, providing functions of elastic suspension and electric conductivity; these suspension wires suspending the frame, the lens and at least one elastic member above the circuit board;

at least one position sensor, located below the driving magnets and being electrically connected with the circuit board; and an external circuit, located below the frame and connected with the circuit board, said external circuit being furnished with an image sensor;

wherein, the lens is received by a lens support and is movable together with the lens support.

In a preferred embodiment, said position sensor is furnished on the external circuit; in addition, at least one of the first lens module and the second lens module is furnished with at least one sensing magnet; the sensing magnet is furnished at a side of the outer periphery of the lens and is corresponding to one of the position sensor located on the external circuit.

In a preferred embodiment, the size of the secondary driving magnet of one of said lens modules located nearby the neighbouring surface is smaller than the size of another said secondary driving magnet of the same lens module located away from the neighbouring surface.

In a preferred embodiment, two ends of the two opposite edges with unequal lengths of the secondary driving magnet are connected by at least one of the following: slope section, arc section and right angle section.

In a preferred embodiment, a difference of lengths between the two opposite edges with unequal lengths of said secondary driving magnet is greater than 20%.

In a preferred embodiment, the secondary driving magnets belonging to said lens modules are arranged across the neighbouring surface along the Y-axis in a staggered manner that, the projections of these secondary driving magnets on the neighbouring surface do not completely overlap with each other or even are completely without any overlap at all; in addition, said multi-lens camera module comprises one of the following: at least one of said lens modules having optical image stabilizer (OIS) function, at least one of said lens modules having auto-focusing (AF) function, at least one of said lens modules having both OIS and AF functions; moreover, the first lens module and the second lens module is one of the following: a spring type lens module or a ball type lens module.

In a preferred embodiment, the driving magnets of at least one of the first lens module and the second lens module further comprises at least one small auxiliary magnet mounted on the frame; the auxiliary magnet is located at the side of the lens module nearby the neighbouring surface; the auxiliary magnet is positioned between the secondary driving magnet and the primary driving magnet of the same lens module; the position of the small auxiliary magnet exceeds an inner edge of the secondary drive magnet nearby the neighbouring surface; the same polarity of the primary driving magnet, the secondary driving magnet and the small auxiliary magnet of the same lens module are all facing toward the lens of the same lens module.

In a preferred embodiment, the small auxiliary magnet is a multipolar magnet.

In a preferred embodiment, the small auxiliary magnet is formed with either a notch or a through hole; a magnetization direction of the small auxiliary magnet is the same as that of the primary driving magnet.

In a preferred embodiment, the distance between the primary driving magnet of the first lens module and the neighbouring surface is shorter than the distance between the primary driving magnet of the second lens module and the neighbouring surface.

In a preferred embodiment, the primary driving magnet of either one of the lens modules is designed with an extended portion extending from the primary driving magnets toward the neighbouring surface; a shape of the extended portion is one of the following: a rectangular body having smaller height, a trapezoid body gradually decreasing in height, a wedged body gradually decreasing both in height and thickness, and a rectangular body having the same height and thickness as other portion of the primary driving magnets.

In a preferred embodiment, a pattern of projection of the primary driving magnet on a plane defined by the X-axis and the Z-axis includes at least one pair of opposite edges with unequal length, and the difference between the lengths of the paired opposite edges of the primary driving magnet is more than 10%.

In a preferred embodiment, a pattern of projection of the primary driving magnet on a plane defined by the X-axis and the Y-axis includes at least one pair of opposite edges with unequal length, and the difference between the lengths of the paired opposite edges of the primary driving magnet is more than 10%.

In a preferred embodiment, the first lens module comprises a small auxiliary magnet located at the side of the first lens module nearby the neighbouring surface; in addition, the first lens module has no secondary driving magnet.

In a preferred embodiment, a projection of the auxiliary magnet of the first lens module on the neighbouring surface is overlapped with a middle portion of the secondary driving magnet of the second lens module located at the other side of the neighbouring surface.

In a preferred embodiment, the distance along the X-axis between the primary driving magnet of the first lens module and the neighbouring surface is shorter than the distance along the X-axis between the primary driving magnet of the second lens module and the neighbouring surface; a projection of the primary driving magnet of the first lens module on a plane defined by the X-axis and the Z-axis is partially overlapped with another magnet of the same first lens module located nearby the neighbouring surface.

In a preferred embodiment, the second lens module is furnished with two secondary driving magnets at the side nearby the neighbouring surface; a covering range of these two secondary driving magnets along the Y-axis exceeds an inner side of the primary driving magnet of the second lens module; the projections of the primary driving magnet and the secondary driving magnet of the second lens module on the neighbouring surface are partially overlapped.

In a preferred embodiment, the frame is formed with at least one notch space extending downward along the Z-axis from an upper surface of the frame to a bottom area; a bottom area of the notch space is the place at which a damping medium is applied.

BRIEF DESCRIPTION OF THE DRAWINGS

The present invention will now be specified with reference to its preferred embodiments illustrated in the drawings, in which.

DESCRIPTION OF THE PREFERRED EMBODIMENT

The invention disclosed herein is directed to a multi-lens camera module. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

The lens module with OIS system usually includes an electromagnetic driving system having either four corner-typed driving magnets or four side-typed driving magnets. These driving magnets are mounted on a frame which is suspended above a base by four suspension wires. For a multi-lens camera module having multiple lens modules, the adjacent two lens modules are close to each other, and the driving magnets in the two lens modules will result in magnetic interference with each other, causing problems such as optical axis deviation (e.g., displacement) and optical axis tilt.

Figure 1:
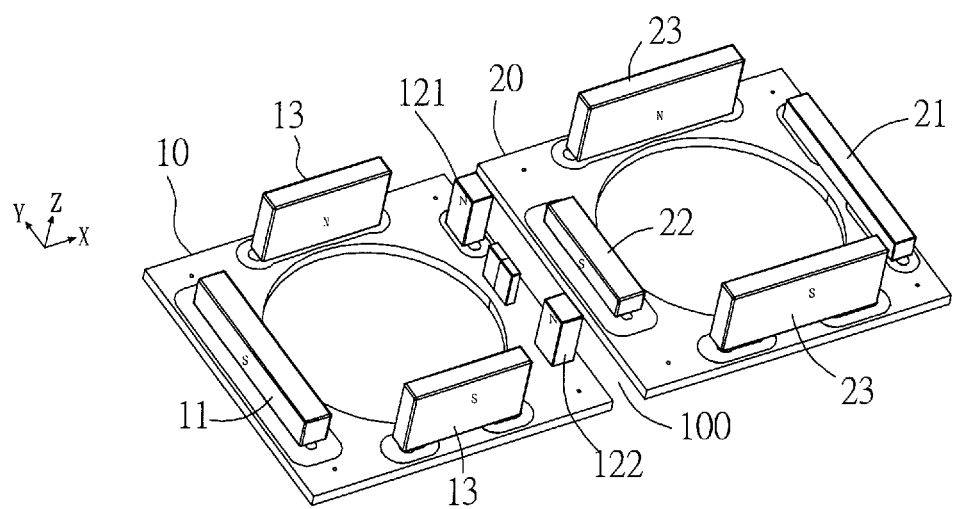
FIG. 1 is an example of a multi-lens camera module developed by the inventors of the invention.

Please refer to FIG. 1, which is an example of a multi-lens camera module developed by the inventors of the invention. This example shows a basic architecture of a multi-lens camera module with two adjacent OIS driving systems. There is a gap between these two adjacent lens modules 10 and 20, and the center of the distance of the gap (i.e., the middle area of the gap) is called as the neighbouring surface 100. By using the space near to the neighbouring surface 100 between two adjacent lens modules 10 and 20, smaller-sized secondary magnets 121, 122 and 22 are furnished to provide magnetic field feedbacks and driving forces at the X-axis and Y-axis directions and pushing forces along the optical axis (i.e., Z-axis), and also to reduce the magnetic interference. The two smaller-sized secondary driving magnets (i.e., the second and third secondary driving magnets 121, 122) are located in the first lens module 10 adjacent to one side of the neighbouring surface 100; while the other smaller-sized secondary driving magnet 22 is located in the second lens module 20 adjacent to the other side of the neighbouring surface 100. The secondary driving magnets 121, 122 and 22 located at two sides of the neighbouring surface 100 are staggeredly arranged; that is, these secondary driving magnets 121, 122 and 22 belonging to two different lens modules 10 and 20 are located at two sides of the neighbouring surface 100 in such a manner that, the projections of these secondary driving magnets 121, 122 and 22 on the neighbouring surface 100 do not completely overlap with each other or even are completely without any overlap at all.

Figure 2:
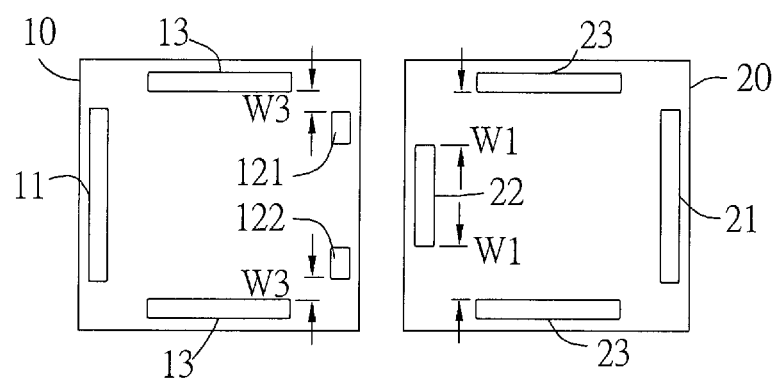
FIG. 2 schematically shows the configuration of the driving magnets of the multi-lens camera module shown in FIG. 1.

Please refer to FIG. 2, which schematically shows the configuration of the driving magnets of the multi-lens camera module shown in FIG. 1. As shown in FIG. 1 and FIG. 2, as the distance between the magnets is closer, the magnetic interaction force is larger, and an interaction force is occurred between the secondary driving magnets 121, 122, 22 on two sides of the neighbouring surface 100; in addition, another interaction force is occurred between the primary driving magnets 13, 23 and the secondary driving magnets 121, 122, 22 of the other lens module located at the other side of the neighbouring surface 100. Therefore, the closer the distance between two neighbouring lens modules 10 and 20, the greater the interaction forces generated between the driving magnets 13, 23, 121, 122, and 22.

Traditional lens module having OIS system usually shares driving magnets with VCM AF. These shared driving magnets not only interact with the Z-axial driving coil wound around the lens in order to generate pushing forces for moving the lens along the Z-axis, but also interact with the horizontal coils furnished on the circuit board therebelow to generate horizontal pushing forces along the X-axis and Y-axis, in order to drive the lens to move horizontally. The lens module having OIS system uses a plurality of suspension wires to suspend the VCM AF, that is, to suspend the frame, elastic member, driving magnets and lens above the circuit board. The closer the distance between two adjacent lens modules having OIS system, the greater the interaction force generated between the driving magnets of these two adjacent lens modules. The interaction between the magnetic fields of the driving magnets in the adjacent two lens modules causes the VCM AF portion of the lens module to be displaced in the elastic range of the suspension wires, which in turn affects the deviation (e.g., displacement and/or tilt) of the imaging optical axis.

Regardless of complex interactions of the magnetic field patterns between the adjacent lens modules having OIS and VCM AF, the total term magnetic field is the sum of the characteristics of driving magnets. Generally speaking, the characteristics of driving magnets will be related to the size, distance, position, magnetic pole and magnetic force of driving magnets. On the one hand, it is desirable to increase the size of driving magnet to make it work with the coil to produce larger electromagnetic force; on the other hand, it is also desirable to reduce the size of the driving magnet so that the magnetic interference can be as smaller as possible. If the original space planning of the lens module is not changed, according to the currently limited internal space of smart phone, the original configuration of the driving magnets in the lens module will be difficult to overcome the magnetic interference, and the balanced design with both small magnetic interference and strong driving force would be impossible.

The multi-lens camera module of the invention reduces the magnetic interference by using the balance method of the interaction force between the magnets under the optimal balance planning of magnetic fields. The total sum of magnetic fields of the multi-lens camera module with either AF, OIS or both will be balanced. The mutual magnetic interference between adjacent lens modules with OIS can be reduced by using the original design planning of mechanism spacing. The displacement variation (e.g., deviation) of optical axis caused by too-closed magnets between adjacent lens modules can also be stabilized. Moreover, better driving forces can also be obtained to decrease power consumption.

In order to achieve the aforementioned features, the multi-lens camera module of the invention comprises at least two lens modules located side-by-side. Each lens module can be a voice coil motor (VCM) lens module having an auto-focusing (AF) or/and an optical image stabilizer (OIS) functions. The surface where two neighbouring lens modules are adjacent with is called as the neighbouring surface. Each lens module comprises a plurality of driving magnets and is defined with an X-axis, a Y-axis and a Z-axis which are perpendicular to each other. Wherein, each lens module defines an optical axis parallel to the Z-axis. The neighbouring surface is parallel with a surface defined by the X and Y axes. A projection view on the neighbouring surface of a plurality of secondary driving magnets located at two sides of the neighbouring surface includes at least one secondary driving magnet which has unequal lengths of two opposite edges along either the Y-axis or the Z-axis, in addition, shapes of the two opposite edges include at least one of the following: slope, arc and straight line. Each of the secondary driving magnets has a central axis parallel to the optical axis. When viewing along the X-axis, a distance W is defined between two neighbouring secondary driving magnets, in addition, these secondary driving magnets are arranged across the neighbouring surface along the Y-axis in a staggered manner.

Figure 3A:
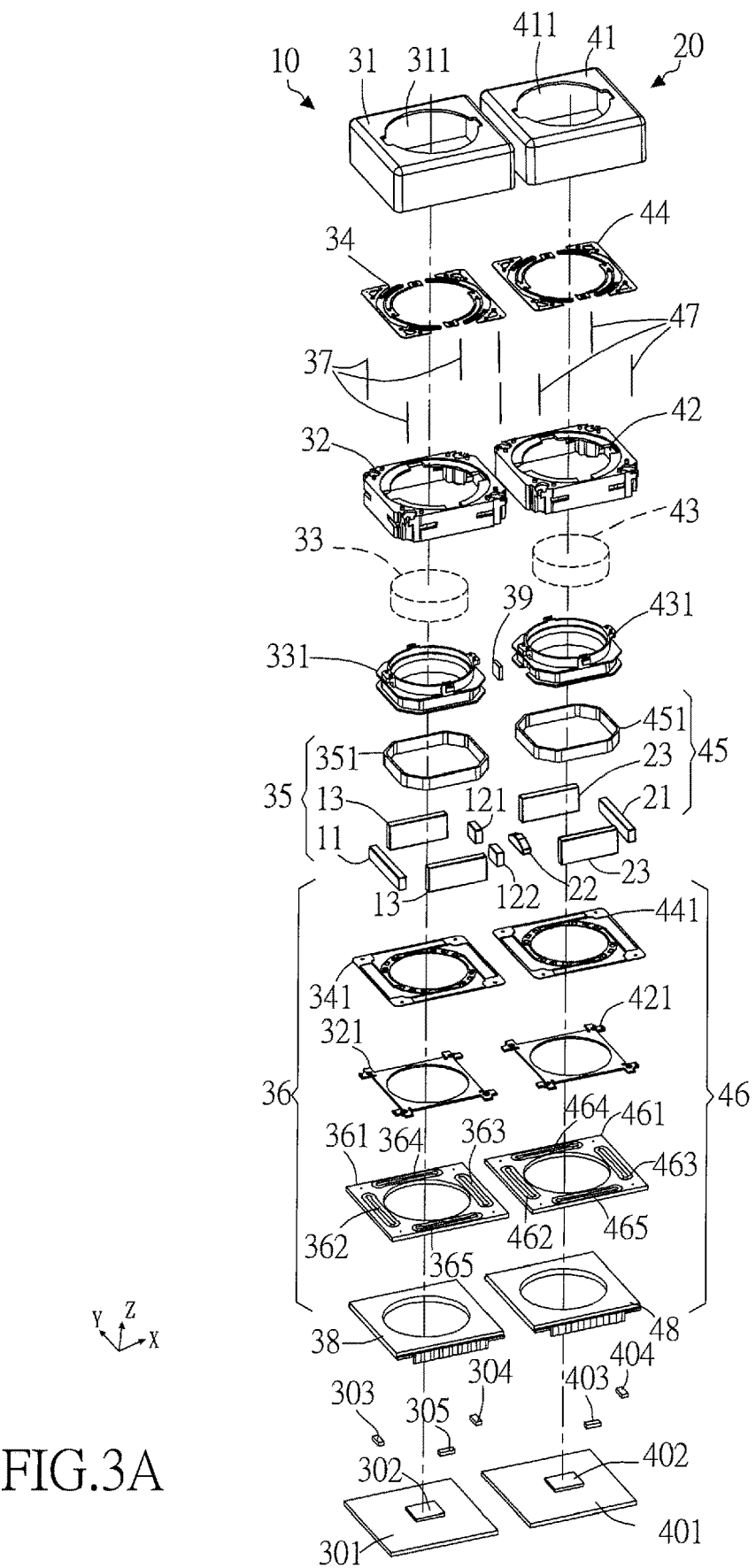
FIG. 3A, FIG. 3B and FIG. 3C respectively are the three-dimensional explosion view, the assembled top view and the assembled sectional view of the first preferred embodiment of the multi-lens camera module (illustrated by a camera module having two lens modules) in accordance with the present invention.
Figure 3B:
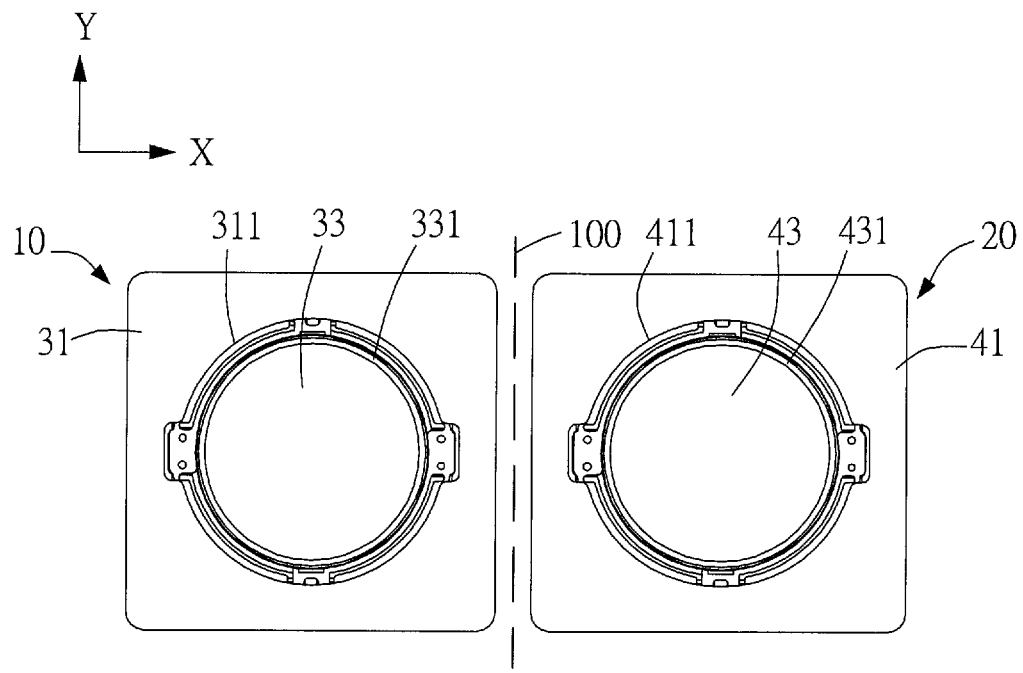
Figure 3C:
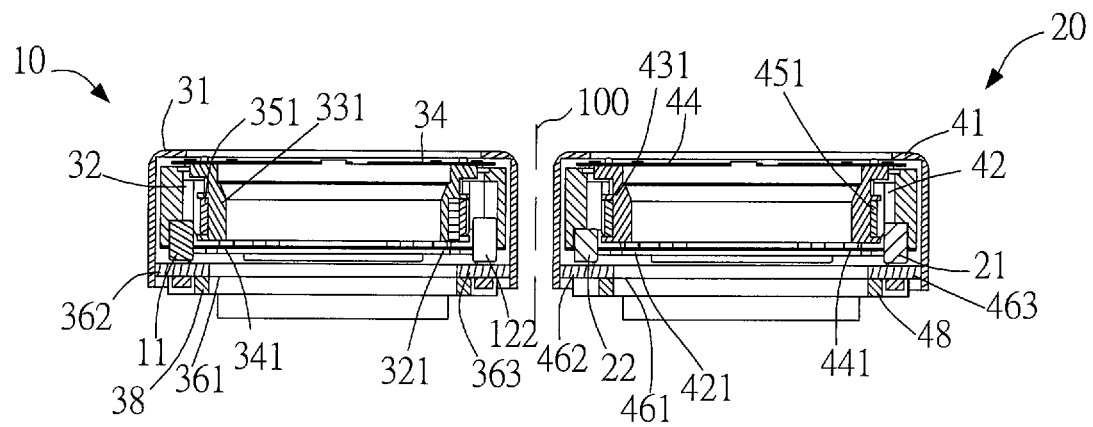

Please refer to FIG. 3A, FIG. 3B and FIG. 3C, which respectively are the three-dimensional explosion view, the assembled top view and the assembled sectional view of the first preferred embodiment of the multi-lens camera module (illustrated by a camera module having two lens modules) in accordance with the present invention. The multi-lens camera module comprises at least a first lens module 10 and a second lens module 20 located at two sides of a neighbouring surface 100. There is a gap between these two adjacent lens modules 10 and 20, and the center of the distance of the gap (i.e., the middle area of the gap) is called as the neighbouring surface 100. Each of the first and second lens modules 10, 20 respectively has an optical axis and is defined with an X-axis, a Y-axis and a Z-axis. The optical axis is parallel to the Z-axis, while the X-axis, the Y-axis and the Z-axis are perpendicular to each other. The neighbouring surface 100 is parallel to the plane defined by Y-axis and Z-axis. In the preferred embodiment, the first lens module 10 and the second lens modules 20 each comprises at least some of the following components: a cover 31, 41, a frame 32, 42, a lens 33, 43 mounted in a lens support 331, 431, at least one elastic member (including upper elastic member 34, 44 and lower elastic member 341, 441), a first driving system 35, 45, a second driving system 36, 46, a plurality of suspension wires 37, 47, a connecting board 38, 48 and a sensing magnet 39.

The cover 31, 41 has a through hole 311, 411. The frame 32, 42 is located in the cover 31, 41 and forms an inner compartment therein. The lens 33, 43 together with the lens support 311, 431 are received within the inner compartment of the frame 32, 42. The elastic members (including upper elastic member 34, 44 and lower elastic member 341, 441) are fixed on a top surface and a bottom surface of the frame 32, 42. The positioning plate 321, 421 clamps and fixes the lower elastic member 341, 441 to the bottom side of the frame 32, 42. Such that, the lens 33, 43 (together with the lens support 331, 431) is retained inside the inner compartment and movable along the optical axis.

The first driving system 35, 45 comprises: at least one driving coil 351, 451, a set of two corresponding primary driving magnets 13, 23 and at least two secondary driving magnets 11, 121, 122, 21, 22. In which, the driving coil 351, 451 is wound around the outer periphery of the lens support 331, 431 of lens 33, 43, and is corresponding to the driving magnets (including primary driving magnets 13, 23 and secondary driving magnets 11, 121, 122, 21, 22) mounted on the frame 32, 42, so as to act as the electromagnetic driving device of AF for providing driving forces along Z-axis. The term "primary driving magnet" means these primary driving magnets 13, 23 are larger in size in order to interact with the driving coil 351, 451 for providing majority parts of driving forces along Z-axis. The sizes of secondary driving magnets 11, 121, 122, 21, 22 are smaller than ⅓ of the primary driving magnets 13, 23, such that, although these secondary driving magnets 11, 121, 122, 21, 22 may also interact with the driving coil 351, 451 to provide driving forces along Z-axis, but these secondary driving magnets 11, 121, 122, 21, 22 are less important in providing Z-axial driving forces, as thus are called as "secondary" driving magnets.

The second driving system 36, 46 at least comprises: a circuit board 361, 461 and at least two horizontal coils 362, 363, 364, 365, 462, 463, 464, 465. These horizontal coils 362, 363, 364, 365, 462, 463, 464, 465 are furnished on the circuit board 361, 461 and are respectively corresponding to the two primary driving magnets 13, 23 and those secondary driving magnets 11, 121, 122, 21, 22, so as to act as the electromagnetic driving device of OIS for providing horizontal driving forces along X-axis and Y-axis.

The connecting board 38, 48 is electrically connecting with both the circuit board 361, 461 and an external circuit 301, 401. The external circuit 301, 401 is located below the frame 32, 42 and is furnished with an image sensor 302, 402. At least one position sensor 303, 304, 305, 403, 404 is furnished on either the connecting board 38, 48 or external circuit 301, 401. The suspension wires 37, 47 provide the functions of elastic suspension and electric conductivity. These suspension wires 37, 47 suspend the frame 32, 42, the lens support 331, 431 (together with the lens 33, 43) and the elastic members 34, 341, 44, 441 above the top side of the circuit board 361, 461. The sensing magnet 39 is furnished at a side of the outer periphery of the lens 33 and is corresponding to one of the sensor 304 located on the external circuit 304.

In the preferred embodiment, the at least two secondary driving magnets comprise: secondary driving magnets 11, 121, 122, 21, 22. The first lens module 10 is adjacent to the second lens module 20, in addition, there is a neighbouring surface 100 located between the first and second lens modules 10, 20. The two secondary driving magnets 121, 122 of the first lens module 10 and the secondary driving magnet 22 of the second lens module 20 are nearby and staggered across the neighbouring surface 100 along the Y-axis direction of the multi-lens camera module. That is, although these three secondary driving magnets 121, 122, 22 are located at two sides of the neighbouring surface 100, however, the projections of these secondary driving magnets 121, 122, 22 on the neighbouring surface 100 are arranged staggeredly along the Y-axis direction in an order of the secondary driving magnet 121, the secondary driving magnet 22 and the secondary driving magnet 122; and moreover, the projections of these secondary driving magnets 121, 122 and 22 on the neighbouring surface 100 do not completely overlap with each other. The driving coil 351, 451 is a ring-typed monopole coil in this embodiment, but can also be one of the following: a ring-typed bipolar coil, a flat-typed bipolar coil, or a printed circuit board (PCB) having a coil circuit.

Figure 3D:
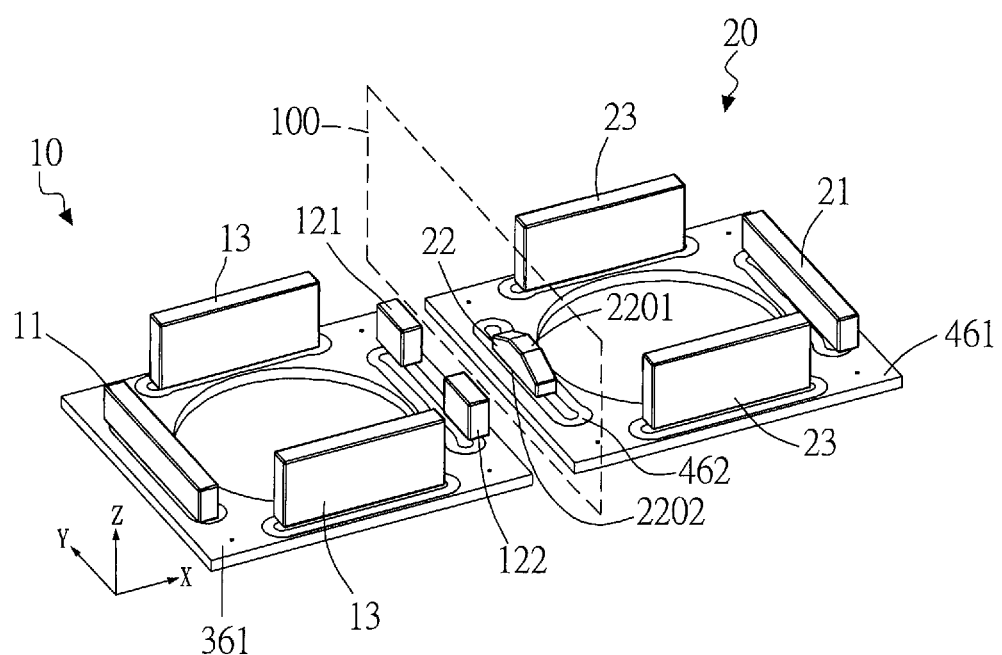
FIG. 3D and FIG. 3E respectively are the schematic perspective diagram of the configuration of driving magnets of two adjacent lens modules, and the schematic diagram of the projections of driving magnets on the neighbouring surface of the first preferred embodiment of the multi-lens camera module in accordance with the present invention.
Figure 3E:
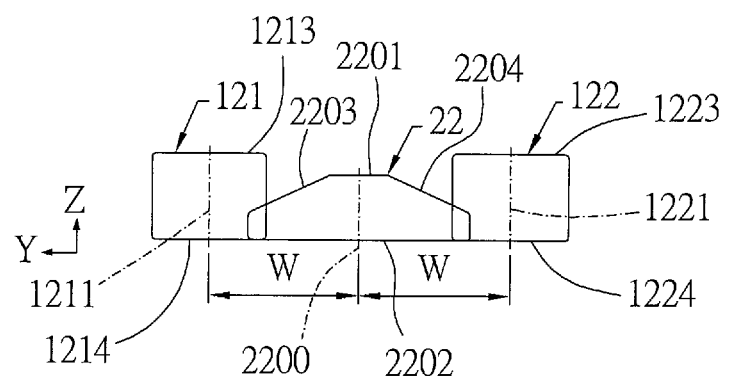

Please refer to FIG. 3D and FIG. 3E, which respectively are the schematic perspective diagram of the configuration of driving magnets of two adjacent lens modules, and the schematic diagram of the projections of driving magnets on the neighbouring surface of the first preferred embodiment of the multi-lens camera module in accordance with the present invention. As shown in FIG. 3E, the pattern of the projection of the secondary driving magnet 22 of the second lens module 20 on the neighbouring surface 100 includes at least a pair of opposite edges (that is, the upper edge 2201 and the lower edge 2202) which have different lengths along the Y-axis direction. The configurations of two lateral edges of the secondary driving magnet 22 are formed by using at least one slope section 2203, 2204 (also referred as slanting-line section) connecting and extending between the end points of the pair of opposite edges (the upper edge 2201 and the lower edge 2202) along the Y-axis direction, such that, the projection of the secondary driving magnet 22 on the neighbouring surface 100 will present a trapezoidal shape having a larger height in the middle portion and gradually decreasing heights at two lateral ends along the Y-axis. In the preferred embodiment, the difference between the lengths of the paired opposite edges (the upper edge 2201 and the lower edge 2202) is greater than 20%. That is, the length of upper edge 2201 is shorter than 80% of the length of lower edge 2202. Each of the secondary driving magnets 121, 122, 22 has a central axis 1211, 1221, 2200 parallel to the optical axis (Z-axis). When watching the projection on the neighbouring surface 100 along the X-axis direction, there is a distance W between the central axis 2200 of the middle one secondary driving magnet 22 and the central axes 1211, 1221 of the other two secondary driving magnets 121, 122. The secondary driving magnets 121, 122 and 22 belonging to two different lens modules 10 and 20 are arranged across the neighbouring surface 100 along the Y-axis in a staggered manner that, the projections of these secondary driving magnets 121, 122 and 22 on the neighbouring surface 100 do not completely overlap with each other or even are completely without any overlap at all. That is, the secondary driving magnet 22 certainly will not completely overlap with the secondary driving magnet 121, the secondary driving magnet 122 or both. The overall length of the secondary driving magnet 22 along the Y-axis is longer than anyone of the secondary driving magnets 121, 122. In this embodiment, the length of the upper edge 2201 and the lower edge 2202 of the secondary driving magnet 22 is different. The upper edge 2201 is shorter than the lower edge 2202, and the middle portion near to the central axis 2200 of the secondary driving magnet 22 is higher than two lateral edges thereof, so as to allow the secondary driving magnet 22 to interact with the driving coil 451 (refer to FIG. 3A) to maintain sufficient pushing force along the Z-axis. In addition, because the top portions of two lateral edges of the secondary driving magnet 22 are cut off to form the slope sections 2203, 2204 (also referred as slanting-line section), the strength of magnetic field of secondary driving magnet 22 is decreased, and thus the interference of magnetic forces between the secondary driving magnets 22 and the secondary driving magnets 121, 122 of the first lens module 10 located at the other side of the neighbouring surface 100 can also be reduced. The balance of the interaction forces can be achieved by adjusting the difference ratio between the paired opposite edges (the upper edge 2201 and the lower edge 2202). Once the magnetic interference is reduced, more space will be available for increasing the horizontal driving forces, for example, to extend the length of the lower edge 2202 in order to increase the length of the lower portion of the secondary driving magnet 22 (for example, but not limited to, shaped like a triangular body) near to the horizontal coil 462, such that the interaction area between the secondary driving magnet 22 and the horizontal coil 462 can be enlarged, and that a performance with stronger horizontal driving force and lower power consumption can be obtained.

Basically, the magnet located in the external magnetic field will endure the torque applied by the external magnetic field, causing the magnetic moment of the magnet to be in the same direction as the external magnetic field. The magnetic field between heteromagnetic poles of two magnets attracting each other is in the same direction as the magnetic moment of the magnets, and the magnetic field is strong. The magnetic fields between the driving magnets are complicated, especially near the magnet's near-field. In this invention, the magnetic field energy is distributed by the interaction forces between the magnetic fields in order to obtain a better balance force and reduce the mutual interference between the magnetic fields.

Figure 4A:
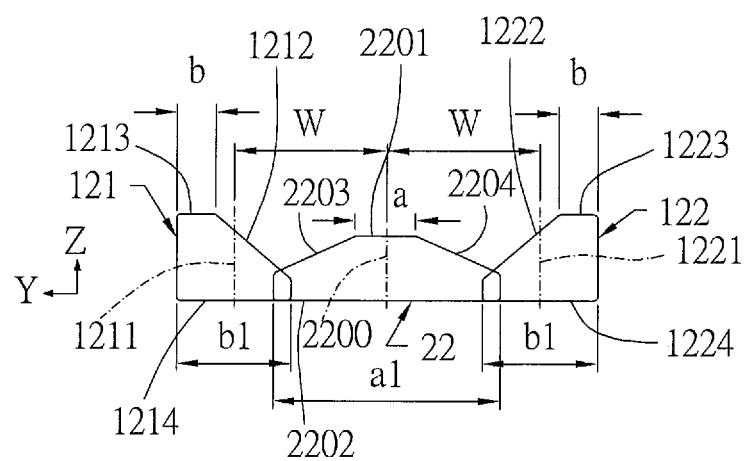
FIG. 4A shows a schematic diagram of the configuration of the driving magnets of the second preferred embodiment of multi-lens camera module in accordance with the present invention.

Please refer to FIG. 4A, which shows a schematic diagram of the configuration of the driving magnets of the second preferred embodiment of multi-lens camera module in accordance with the present invention. According to the descriptions above, based on the condition that each one of the two secondary driving magnets 121, 122 of the first lens module 10 nearby the neighbouring surface 100 is also further formed with a slope section 1212, 1222 (also referred as slanting-line section) at the upper edge 1213, 1223, the influence of total magnetic field force on magnetic interference of multi-lens camera module is tested by adjusting the lateral lengths of the paired opposite edges (i.e., the upper edge 2201 which is marked as section "a" and lower edge 2202 which is marked as section "a1") of the second lens module 20 nearby the neighbouring surface 100, in order to understand what is the relationship between the severity of magnetic interference and the configuration of the equal or unequal lengths of the paired two opposite edges (the upper edge 2201 and lower edge 2202) of the secondary driving magnet 22 of the second lens module 20. In this embodiment, the difference between the lengths of the paired opposite edges (the shorter upper edge 2201 with section "a" and the longer lower edge 2202 with section "a1") is greater than 20% of the length of section "a", and two lateral ends of the paired opposite edges (the upper edge 2201 and the lower edge 2202) are connected by the sections 2203, 2204 to form cut-off corners thereat. Moreover, in addition to the configuration that the difference of lengths between the section "a" of upper edge 2201 and the section "a1" of lower edge 2202 is greater than 20%, the height difference between the height of the highest middle portion of the secondary driving magnet 22 and the heights of the two lateral edges of the secondary driving magnet 22 is also greater than 20% of the heights of the two lateral edges.

Figure 4B:
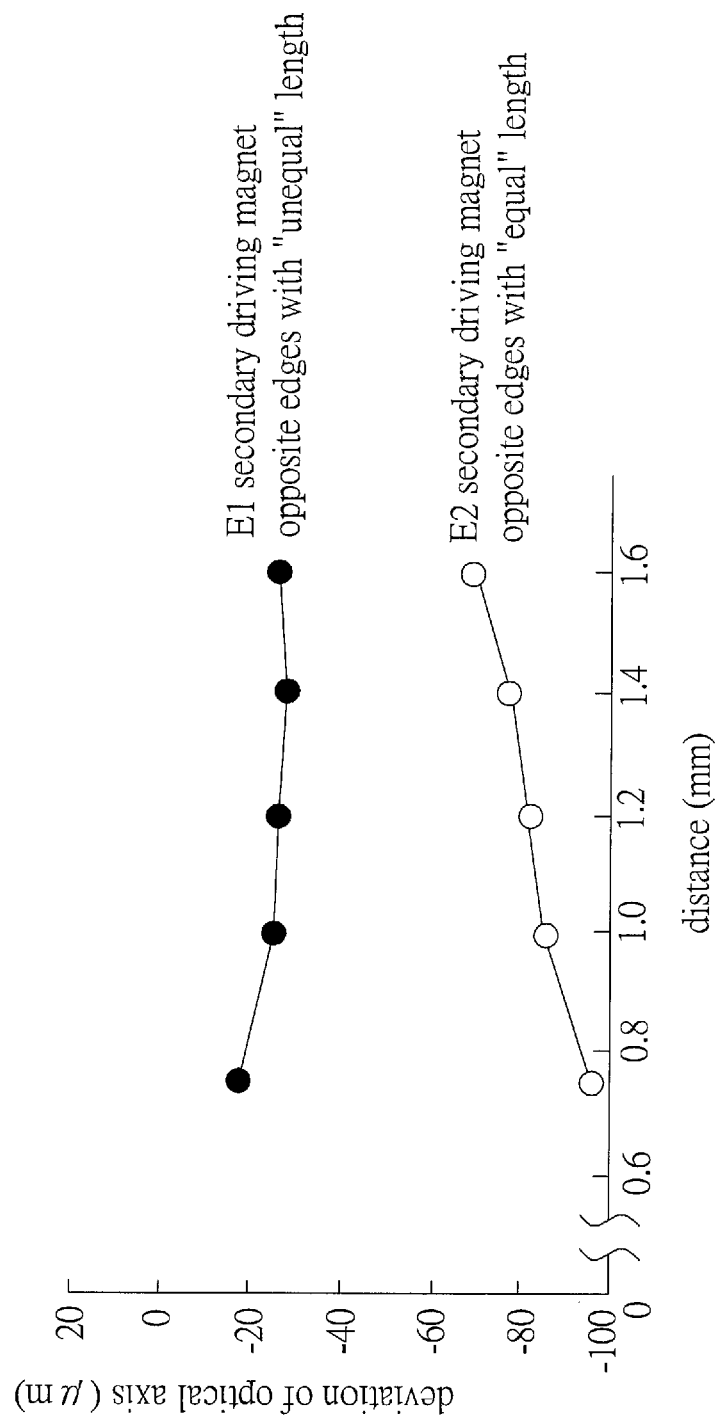
FIG. 4B is a curve diagram showing the test results of the deviations of optical axis caused by magnetic interference according to the multi-lens camera modules of the embodiment shown in FIG. 1 and the second preferred embodiment shown in FIG. 4A.

Refer to FIG. 4B, which is a curve diagram showing the test results of the deviations (e.g., displacement and/or tilt) of optical axis caused by magnetic interference according to the multi-lens camera modules of the embodiment shown in FIG. 1 and the second preferred embodiment shown in FIG. 4A. From the curve diagram of FIG. 4B, the relationship between the deviation of optical axis and the distance between two lens modules 10, 20 (i.e., the distance of the gap between two lens modules 10, 20) can be seen. In which, curve line "E1" represents the test result of the multi-lens camera module of the second preferred embodiment shown in FIG. 4A, wherein the paired opposite edges (the upper edge 2201 and the lower edge 2202) of secondary driving magnet 22 have unequal lengths; in addition, curve line "E2" represents the test result of the multi-lens camera module shown in FIG. 1, wherein the lengths of the paired opposite edges (the upper edge and the lower edge) of secondary driving magnet 22 are equal. Considering that, the optical axis is not interfered by the magnetic interference when the deviation value of optical axis is equal to 0 μm. It is obvious that, the severity of deviation of optical axis caused by magnetic interference is less for the curve line "E1" (opposite edges have unequal lengths) than the curve line "E2" (opposite edges have equal lengths) when the value of distance is the same. That is, as the secondary driving magnet 22 is formed with a shorter upper edge 2201 and two slope sections 2203, 2204, as the curve line "E1" (opposite edges have unequal lengths) represents, a middle portion of the secondary driving magnet 22 has sufficient height and volume while two lateral edges thereof are lowered down to decrease the magnetic interaction between two lateral edges of the secondary driving magnet 22 and the other two secondary driving magnet 121, 122 of the first lens module 10. Therefore, the interaction of magnetic force as well as the magnetic interference can be gradually reduced according to the configuration of the two slope sections 2203, 2204 (where the height of secondary driving magnet 22 is gradually decreasing from middle to lateral side). As shown in FIG. 4B, when the distance between two lens module is equal to 1.2 mm, the deviation value of optical axis of curve line "E2" is 81 μm, and which of curve line "E1" is as low as 26 μm, the difference between these two values is 55 μm, which means the deviation of optical axis is improved by four times. Therefore, when two adjacent lens modules are equipped with several secondary driving magnets nearby the neighbouring surface, the magnetic interference can be decreased by making at least one of these secondary driving magnets to include cut-off corners (slope sections). The configuration of cut-off corners reduces the sensitivity of the distance adjustment between two adjacent lens modules. The cut-off corners (slope sections) allows the middle portion near to the central axis 2200 of the secondary driving magnet 22 to have a greater height than two lateral edges thereof, so as to maintain sufficient upward pushing force along Z-axis; furthermore, the length of the lower edge 2202 of secondary driving magnet 22 is longer so as to maintain sufficient horizontal pushing forces along X-axis and Y-axis.

Figure 5:
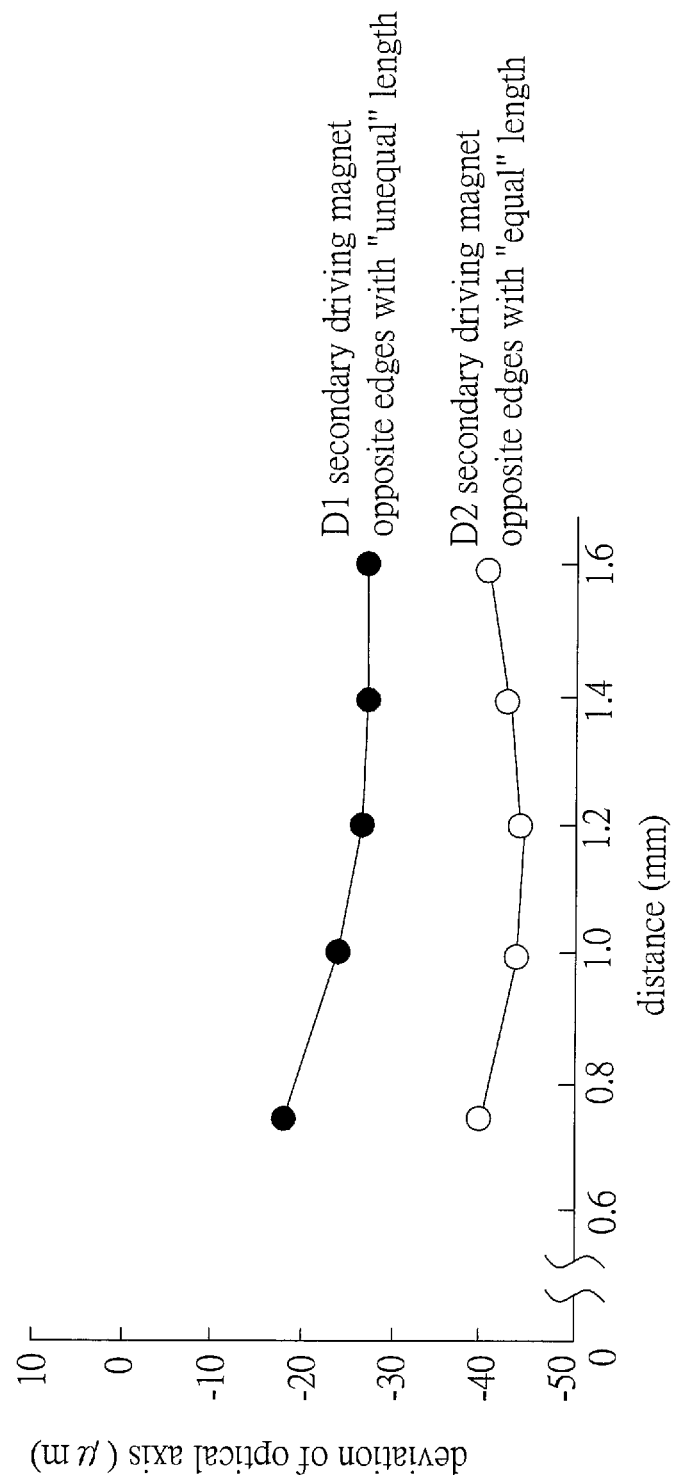
FIG. 5 is a curve diagram showing the test results of the deviations of optical axis caused by magnetic interference according to the multi-lens camera modules of the first preferred embodiment shown in FIG. 3E and the second preferred embodiment shown in FIG. 4A.

Please refer to FIG. 5, which is a curve diagram showing the test results of the deviations (e.g., displacement and/or tilt) of optical axis caused by magnetic interference according to the multi-lens camera modules of the first preferred embodiment shown in FIG. 3E and the second preferred embodiment shown in FIG. 4A. From the curve diagram of FIG. 5, the relationship between the deviation of optical axis and the distance between two lens modules 10, 20 (i.e., the distance of the gap between two lens modules 10, 20) can be seen. In which, curve line "D1" represents the test result of the multi-lens camera module of the second preferred embodiment shown in FIG. 4A, wherein the paired opposite edges (the upper edge 1213, 1223 and the lower edge 1214, 1224) of secondary driving magnet 121, 122 have unequal lengths; in addition, curve line "D2" represents the test result of the multi-lens camera module of the second preferred embodiment shown in FIG. 3E, wherein the lengths of the paired opposite edges (the upper edge 1213, 1223 and the lower edge 1214, 1224) of secondary driving magnet 121, 122 are equal. Based on the condition that the secondary driving magnet 22 of the second lens module 20 is formed with slope sections 2203, 2204 (also referred as slanting-line section) at the upper edge 2201, the influence of total magnetic field force on magnetic interference of multi-lens camera module is tested by adjusting the lateral lengths of the paired opposite edges (i.e., the upper edges 1213, 1223 which are marked as section "b" and lower edges 1214, 1224 which are marked as section "b1") of the secondary driving magnets 121, 122 of first lens module 10 nearby the neighbouring surface 100, in order to understand what is the relationship between the severity of magnetic interference and the configuration of the equal or unequal lengths of the paired opposite edges (the upper edges 1213, 1223 and lower edges 1214, 1224) of the secondary driving magnets 121, 122 of the first lens module 10. In the second preferred embodiment shown in FIG. 4A, the difference between the lengths of paired opposite edges (the shorter upper edges 1213, 1223 with section "b" and the longer lower edges 1214, 1224 with section "b1") is greater than 20% of the length of section "b1", and two lateral ends of the paired opposite edges (the upper edges 1213, 1223 and the lower edges 1214, 1224) are connected by the slope sections 1212, 1222 to form cut-off corners thereat. It can be seen from FIG. 5 that, the severity of deviation of optical axis caused by magnetic interference is less for the curve line "D1" (opposite edges of secondary driving magnets 121, 122 have unequal lengths as shown in FIG. 4A) than the curve line "D2" (opposite edges of secondary driving magnets 121, 122 have equal lengths as shown in FIG. 3E) when the value of distance is the same. When the distance between two lens module is equal to 1.2 mm, the deviation value of optical axis of curve line "D2" is 44 µm, and which of curve line "D1" is 26 µm, which means the deviation of optical axis is improved by 1.7 times. That is, as the secondary driving magnets 121, 122 are formed with a shorter upper edges 1213, 1223 and slope sections 1212, 1222, as the curve line "D1" (opposite edges have unequal lengths) represents, the interaction of magnetic force as well as the magnetic interference between the secondary driving magnets 121, 122 of first lens module 10 and the other secondary driving magnets 22 of second lens module 20 can be reduced.

Figure 6:
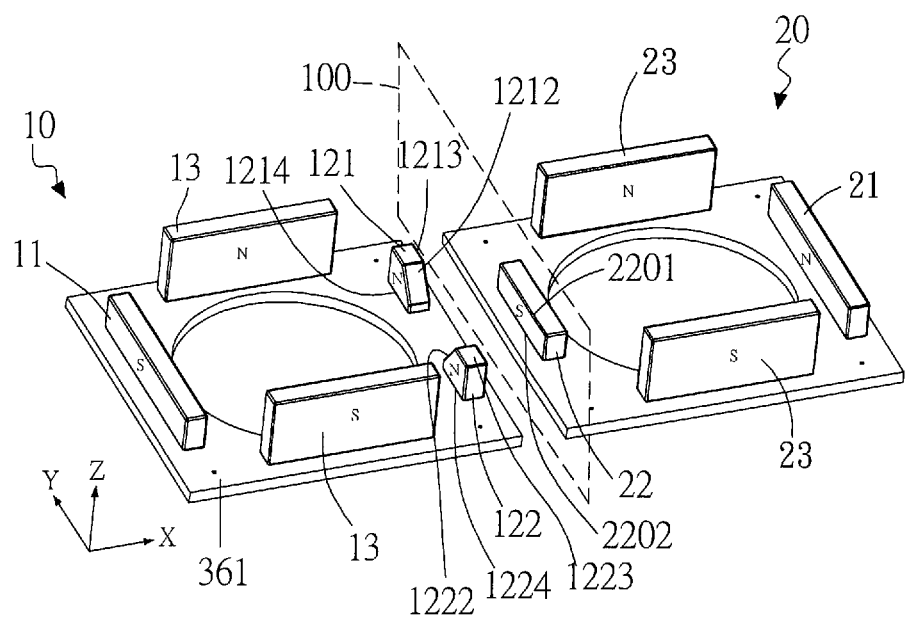
FIG. 6 is a schematic perspective diagram of the configuration of driving magnets of two adjacent lens modules of the third preferred embodiment of multi-lens camera module in accordance with the present invention.

Please refer to FIG. 6, which is a schematic perspective diagram of the configuration of driving magnets of two adjacent lens modules of the third preferred embodiment of multi-lens camera module in accordance with the present invention. As shown in FIG. 6, the magnetic interference between two adjacent lens modules 10, 20 are caused by the secondary driving magnets 121, 122, 22 located at two sides of the neighbouring surface 100. When watching the projection on the neighbouring surface 100 along the X-axis direction, there is a distance between the central axis of the middle one secondary driving magnet 22 and the central axes of the other two secondary driving magnets 121, 122. The secondary driving magnets 121, 122 and 22 belonging to two different lens modules 10 and 20 are arranged across the neighbouring surface 100 along the Y-axis in a staggered manner that, the projections of these secondary driving magnets 121, 122 and 22 on the neighbouring surface 100 do not completely overlap with each other or even are completely without any overlap at all. The difference between this third preferred embodiment and the first preferred embodiment is that, the secondary driving magnet 22 of the second lens module 20 has an elongated rectangular-body configuration, and the secondary driving magnets 121 and 122 of the first lens module 10 include at least one cut-off corner configuration. The projection of each of the secondary driving magnets 121, 122 projected onto the neighbouring surface 100 has at least one pair of opposite edges (upper and lower edges 1213, 1214, 1223, 1224) having unequal lengths. Moreover, the beveled configuration (i.e., cut-off corner) of each of the secondary driving magnets 121, 122 is formed by connecting at least one oblique line segment (i.e., slope section 1212, 1222) at both ends of the paired opposite edges (upper and lower edges 1213, 1214, 1223, 1224), wherein, the difference of lengths between the shorter upper edges 1213, 1223 and the longer lower edges 1214, 1224 is greater than 20%. By using the configurations that the lengths of upper edges 1213, 1223 are shorter than the lengths of lower edges 1214, 1224 of the secondary driving magnets 121, 122 nearby the neighbouring surface 100 of the first lens module 10, and two ends of the upper edges 1213, 1223 and lower edges 1214, 1224 are connected by slope sections 1212, 1222 to form cut-off corners thereat, the magnetic energies and interaction forces between different magnetic fields can be reduced, and the magnetic interference can also be reduced. In addition, the outer portion of each secondary driving magnets 121, 122 near to the primary driving magnet 13 is higher than the inner portion near to the center axis of the secondary driving magnet 22, such that the higher outer portion of the secondary driving magnets 121, 122 can interact with the driving coil to maintain sufficient upward pushing forces along Z-axis. Furthermore, the length of lower edge 1214, 1224 of secondary driving magnet 121, 122 is longer for interacting with the horizontal coil so as to maintain sufficient horizontal pushing forces along X-axis and Y-axis.

Figure 7:
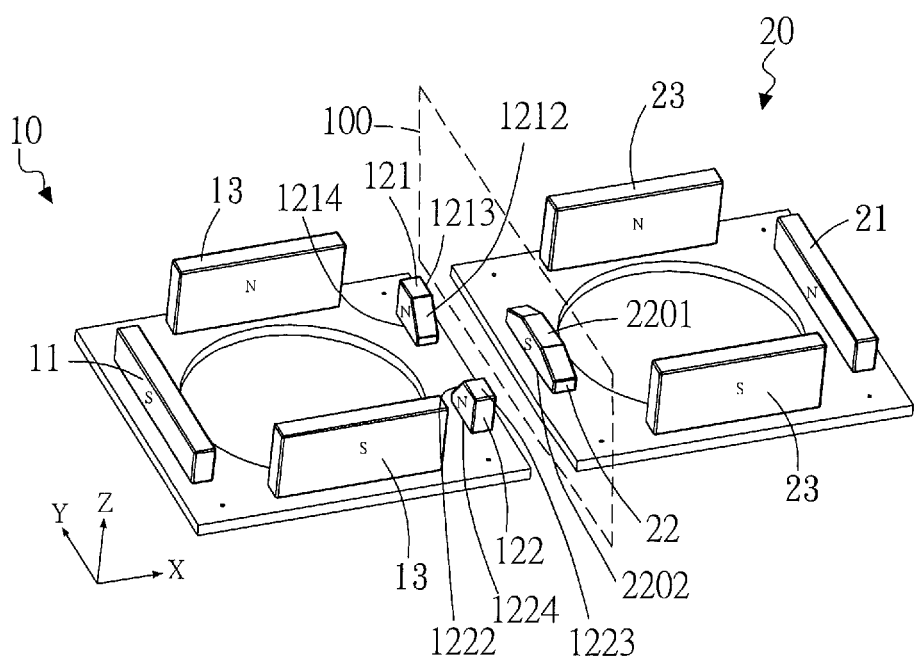
FIG. 7 is a schematic perspective diagram of the configuration of driving magnets of two adjacent lens modules of the second preferred embodiment of multi-lens camera module as shown in FIG. 4A.
Figure 8A:
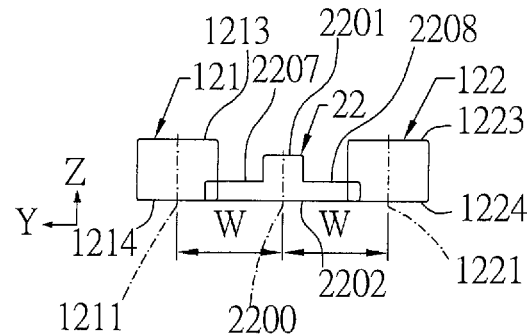
FIGS. 8A to 8F are the schematic diagrams of various embodiments of the projections of secondary driving magnets on the neighbouring surface of the multi-lens camera module in accordance with the present invention.
Figure 8B:
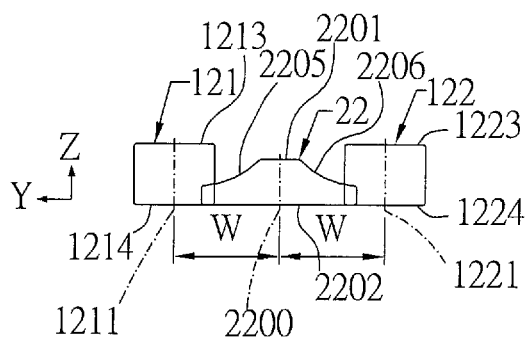
Figure 8C:
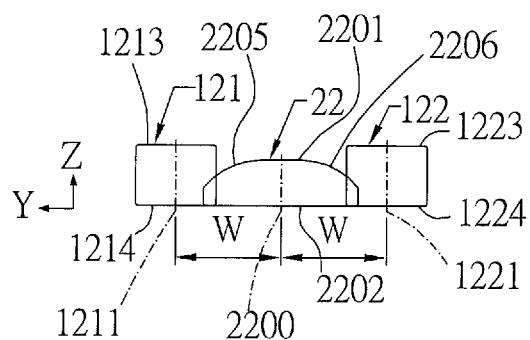
Figure 8D:
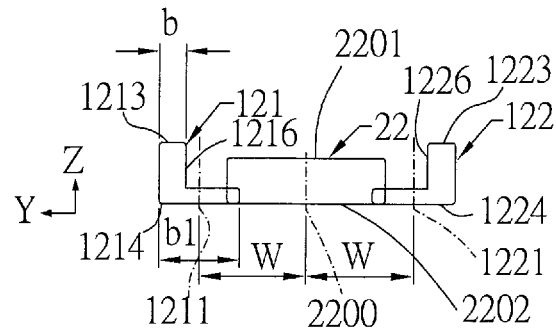
Figure 8E:
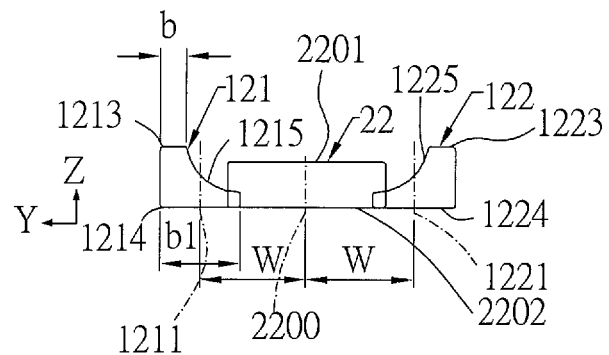
Figure 8F:
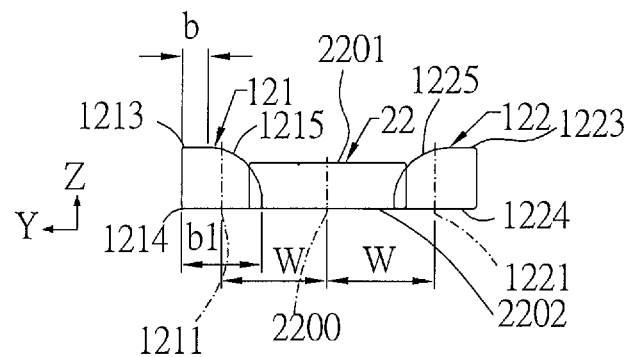

Please refer to FIG. 7, which is a schematic perspective diagram of the configuration of driving magnets of two adjacent lens modules of the second preferred embodiment of multi-lens camera module as shown in FIG. 4A. The difference between the second preferred embodiment shown in FIG. 7 and the first preferred embodiment shown in FIG. 3A is that, the patterns of projections of the secondary driving magnets 121, 122, 22 of first lens module 10 and second lens module 20 on the neighbouring surface 100 each includes a pair of opposite edges (upper edge 1213, 1223, 2201 and lower edge 1214, 1224, 2202) having unequal lengths. The beveled configuration (i.e., cut-off corner) of each of the secondary driving magnets 121, 122, 22 is formed by connecting at least one oblique line segment (i.e., slope section 1212, 1222, 2203, 2204) at the ends of the paired opposite edges (upper and lower edges 1213, 1214, 1223, 1224, 2201, 2202), wherein, the difference of lengths between the shorter upper edge 1213, 1223, 2201 and the longer lower edge 1214, 1224, 2202 is greater than 20%. By using the configurations that the lengths of upper edge 1213, 1223, 2201 are shorter than the lengths of lower edge 1214, 1224, 2202 of the secondary driving magnets 121, 122, 22 nearby the neighbouring surface 100 of the first and second lens modules 10, 20, and the ends of the upper edge 1213, 1223, 2201 and lower edge 1214, 1224, 2202 are connected by slope section 1212, 1222, 2203, 2204 to form cut-off corners thereat, the magnetic energies and interaction forces between different magnetic fields can be reduced, and the magnetic interference can also be reduced. Furthermore, the length of lower edge 1214, 1224, 2202 of secondary driving magnet 121, 122, 22 is longer for interacting with the horizontal coil so as to maintain sufficient horizontal pushing forces along X-axis and Y-axis. The novel design of the configuration of secondary driving magnets 121, 122, 22 of this second preferred embodiment can significantly reduce the magnetic interference under the same power consumption.

Please refer to FIGS. 8A to 8F, which are the schematic diagrams of various embodiments of the projections of secondary driving magnets on the neighbouring surface of the multi-lens camera module in accordance with the present invention. According to these different embodiments, the projections of secondary driving magnets 121, 122, 22 on the neighbouring surface 100 always include at least one secondary driving magnets 121, 122, 22 having at least one pair of opposite edges (upper edge 1213, 1223, 2201 and lower edge 1214, 1224, 2202) with different lengths, in addition, the ends of the upper edge 1213, 1223, 2201 and the lower edge 1214, 1224, 2202 are connected by at least one slope section, arc section 1215, 1225 (see FIG. 8E and FIG. 8F), 2025, 2026 (see FIG. 8B and FIG. 8C), or right angle section 1216, 1226 (see FIG. 8D), 2207, 2208 (see FIG. 8A), so as to form the secondary driving magnets 121, 122, 22 with cut-off corners; wherein, the difference of lengths between the shorter upper edge 1213, 1223, 2201 and the longer lower edge 1214, 1224, 2202 is greater than 20% of the shorter upper edge 1213, 1223, 2201.

Figure 9A:
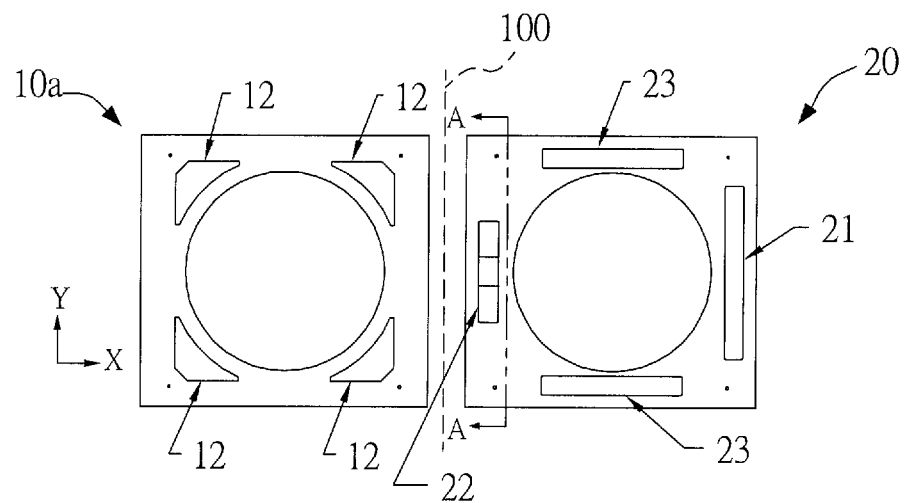
FIG. 9A shows a schematic top view of the fourth preferred embodiment of multi-lens camera module in accordance with the present invention, in which the first lens module includes four corner-typed driving magnets.
Figure 9B:
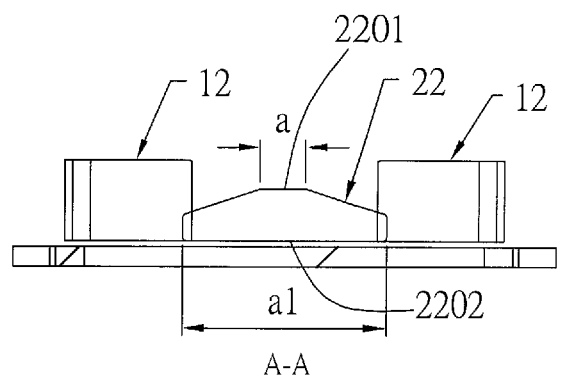
FIG. 9B is a schematic diagram showing the projection (viewing from A-A direction) of driving magnets on the neighbouring surface of the multi-lens camera module of the fourth preferred embodiment shown in FIG. 9A.

Please refer to FIG. 9A and FIG. 9B. FIG. 9A shows a schematic top view of the fourth preferred embodiment of multi-lens camera module in accordance with the present invention, in which the first lens module includes four corner-typed driving magnets. FIG. 9B is a schematic diagram showing the projection (viewing from A-A direction) of driving magnets on the neighbouring surface of the multi-lens camera module of the fourth preferred embodiment shown in FIG. 9A. As shown in FIG. 9A and FIG. 9B, the cut-off corner configuration of the secondary driving magnet having at least one pair of opposite edges with unequal length can also be applied in the first lens module 10a having four corner-typed driving magnets 12. The difference between the multi-lens camera module of this fourth preferred embodiment and the first preferred embodiment is that, the first lens module 10a is equipped with two corner-typed driving magnets 12 at a side adjacent to the neighbouring surface 100, which means, the magnetization directions of the secondary driving magnets 12, 22 located at two sides of neighbouring surface 100 and belong to two different lens modules 10a, 20 are not parallel. As shown in FIG. 9B, the length "a" of the upper edge 2201 is shorter than the length "a1" of lower edge 2202 of the secondary driving magnet 22, in addition, the corners located at two upper ends of the secondary driving magnet 22 near to the corner-typed driving magnets 12 are cut-off, and moreover, the middle portion of the upper edge 2201 still has a proper length of "a"; such that the middle portion of the secondary driving magnet 22 can have higher height to maintain a large area to interact with the driving coil of AF so as to provide sufficient pushing force along the Z-axis. The length "a1" of the lower edge 2202 is longer in order to improve the horizontal driving force generated by the magnetic interaction between the secondary driving magnet 22 and the horizontal coil of OIS furnished therebelow on the circuit board. That is, the cut-off corners can reduce the interacting area at two upper ends of secondary driving magnet 22 along the Y-axis, and the magnetic interacting force between the secondary driving magnet 22 and the nearby corner-typed driving magnets 12 can be effectively reduced.

Figure 9C:
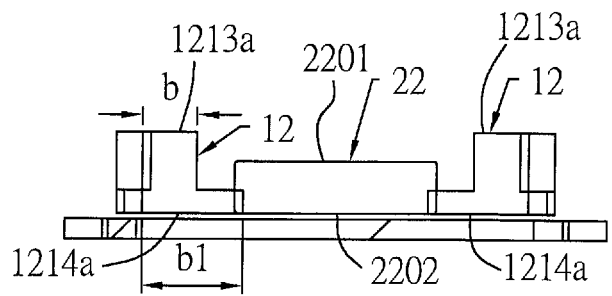
FIGS. 9C to 9G are the schematic diagrams of various embodiments of the projections of driving magnets on the neighbouring surface of the multi-lens camera module in accordance with the present invention, wherein the first lens module includes corner-typed driving magnets.
Figure 9D:
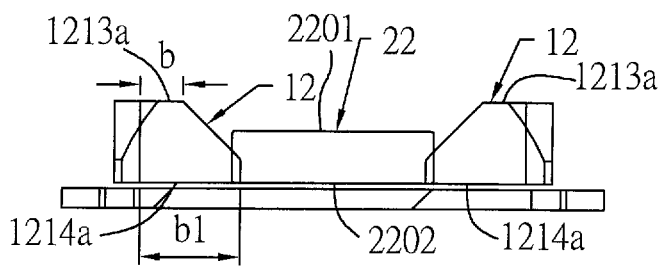

Please refer to FIGS. 9C to 9G, which are the schematic diagrams of various embodiments of the projections of driving magnets on the neighbouring surface of the multi-lens camera module in accordance with the present invention, wherein the first lens module includes corner-typed driving magnets. The difference between the embodiments shown in FIGS. 9C and 9D and FIG. 9B is that, in FIGS. 9C and 9D, the secondary driving magnet 22 of the second lens module 20 nearby the neighbouring surface has a pair of opposite edges (upper edge 2201 and lower edge 2202) with equal length and has a shape like a long rectangular body. The driving magnets 12 of first lens module 10a nearby the neighbouring surface are corner-typed driving magnets. The configuration of the upper edge 1213a and lower edge 1214a of the driving magnets 12 facing toward the secondary driving magnet 22 is designed with unequal length, and the ends of the paired upper and lower edges 1213a, 1214a are connected by at least one slope section (see FIG. 9D) or cut-off configuration (see FIG. 9C); such that, a cut-off corner is formed at the driving magnets 12 at one end of the upper edge 1213a near to the secondary driving magnet 22 in order to reduce the magnetic interaction forces. Which means, the upper edge 1213a of corner-typed driving magnet 12 of first lens module 10a nearby the neighbouring surface 100 has a shorter length "b", and a corner part of corner-typed driving magnet 12 near to the secondary driving magnet 22 is cut-off, while the other part of corner-typed driving magnet 12 away from the secondary driving magnet 22 remains its original height; such that, the overlapping area between the projections of the secondary driving magnet 22 and the corner-typed driving magnet 12 on the neighbouring surface 100 can be reduced, and the magnetic interaction forces can also be reduced. Moreover, the length "b1" of the lower edge 1214a of corner-typed driving magnet 12 is larger than the upper edge 1213a in order to interact with the horizontal coils to provide sufficient horizontal driving force.

Figure 9E:
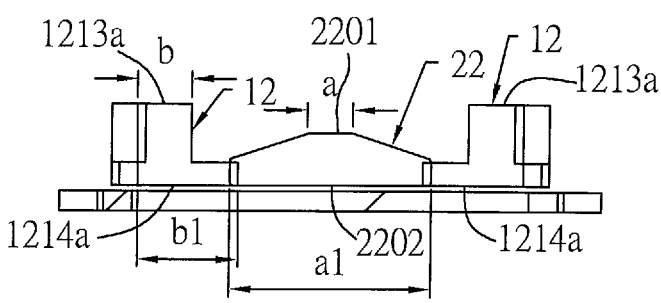
Figure 9F:
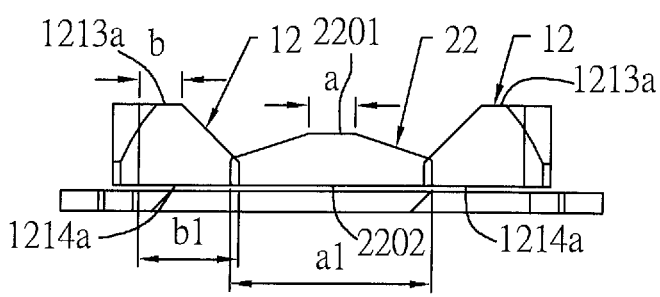
Figure 9G:
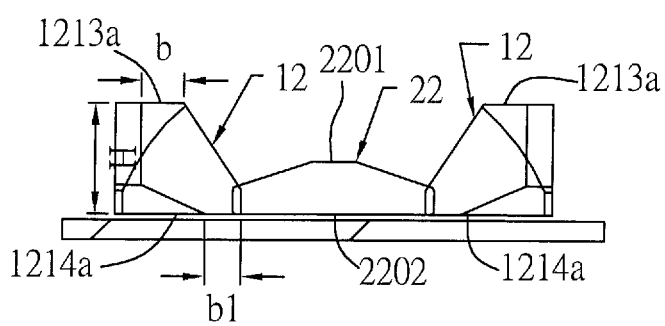

The difference between the embodiments shown in FIGS. 9E, 9F, 9G and FIG. 9B is that, in FIGS. 9E, 9F and 9G, the secondary driving magnet 22 of second lens module 20 and the corner-typed driving magnets 12 of first lens module 10a nearby the neighbouring surface are all configured with a pair of opposite edges (upper edge 2201, 1213a and lower edge 2202, 1214a) with unequal length, such that at least one cut-off corner is formed at the driving magnets 12, 22 at the end of the upper edge 1213a, 2201 in order to reduce the magnetic interaction forces. Which means, the upper edge 1213a of corner-typed driving magnet 12 of first lens module 10a nearby the neighbouring surface 100 has a shorter length "b", and a corner part of corner-typed driving magnet 12 near to the secondary driving magnet 22 is cut-off, while the other part of corner-typed driving magnet 12 away from the secondary driving magnet 22 remains its original height. In the meantime, the upper edge 2201 of secondary driving magnet 22 of second lens module 20 also has a shorter length "a", and two corner parts of the secondary driving magnet 22 near to the corner-typed driving magnets 12 are also cut-off, while the middle part of the secondary driving magnet 22 remains its original height. Such that, the overlapping area between the projections of the secondary driving magnet 22 and the corner-typed driving magnets 12 on the neighbouring surface 100 can be reduced, and the magnetic interaction forces can also be reduced. Moreover, the length "b1" of the lower edge 1214a of corner-typed driving magnet 12 is larger than the upper edge 1213a, and the length "a1" of the lower edge 2202 of secondary driving magnet 22 is also larger than the upper edge 2201, in order to interact with the horizontal coils to provide sufficient horizontal driving force. That is, no matter the driving magnet nearby the neighbouring surface is corner-typed or rectangular bar liked, the projection of the driving magnet on the neighbouring surface will has at least one pair of opposite edges (upper edge and lower edge) with unequal length, and the ends of the paired opposite edges are connected by at least one slope section (see FIG. 9F), arc section (see FIG. 9G) or cut-off configuration (see FIG. 9E), so as to reduce the magnetic interference.

Figure 10A:
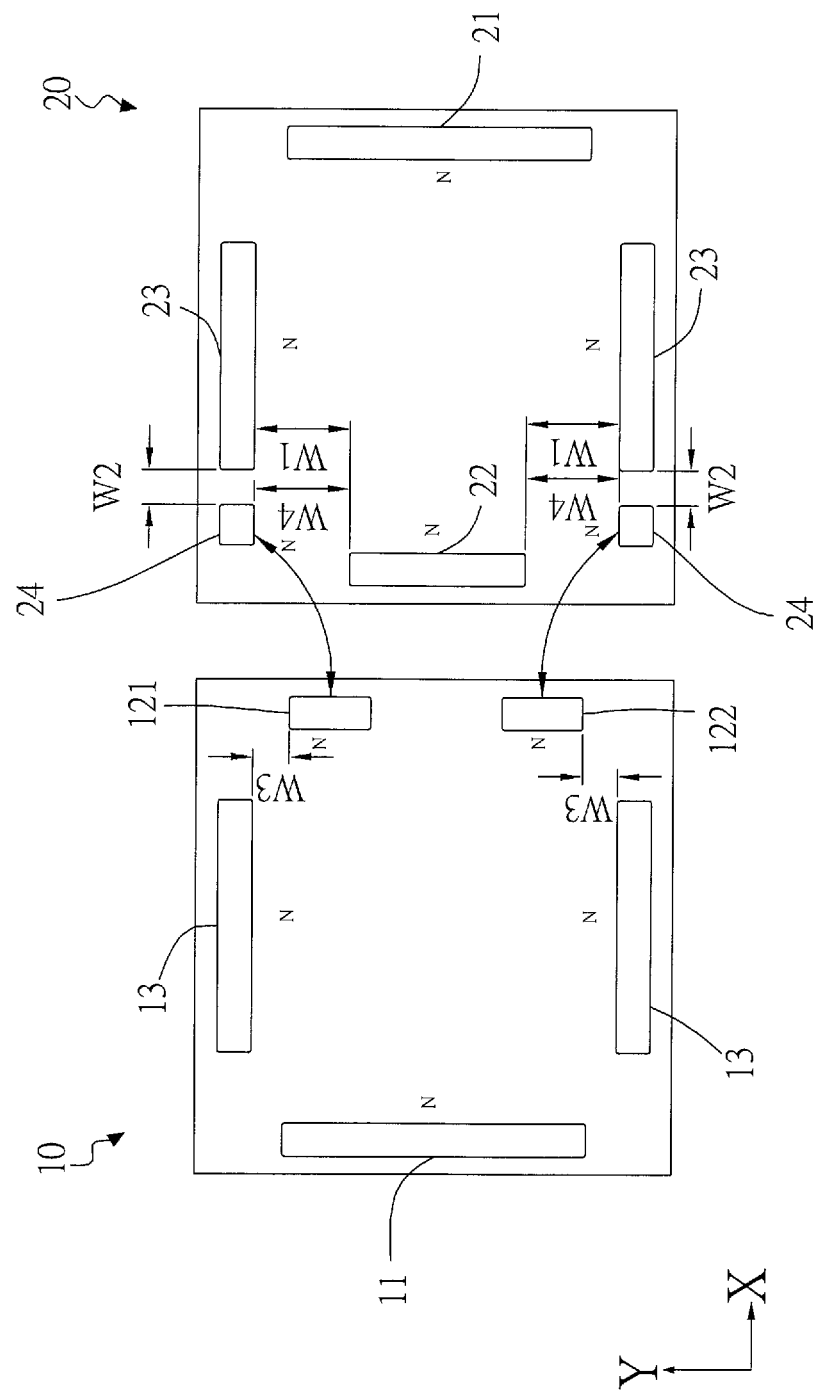
FIG. 10A is a schematic top view of the fifth preferred embodiment of the multi-lens camera module in accordance with the present invention.

FIG. 10A is a schematic top view of the fifth preferred embodiment of the multi-lens camera module in accordance with the present invention. The multi-lens camera module comprises a first lens module 10 and a second lens module 20 adjacent to each other. A plurality of secondary driving magnets 121, 122, 22 of these two lens module 10, 20 are arranged across the neighbouring surface along the Y-axis in a staggered manner, and each of these secondary driving magnets 121, 122, 22 has a center axis parallel to the optical axis. When viewing the projection of these secondary driving magnets 121, 122, 22 on the neighbouring surface along the X-axis direction, these secondary driving magnets 121, 122, 22 are partially, but not completely, overlapped. The distance "W1" (in Y-axis direction) between the primary driving magnet 23 and the secondary magnet 22 of the second lens module 20 is larger than the distance "W3" (in Y-axis direction) between the primary driving magnet 13 and the secondary magnet 121, 122 of the first lens module 10, so as to allow the magnetic line of force to pass through. In this fifth preferred embodiment, the second lens module 20 has a larger distance "W1" between the two primary driving magnets 23 and the secondary magnet 22, and moreover, two smaller auxiliary magnets 24 are added at locations between one end of the primary driving magnets 23 and two ends of the secondary magnet 22 nearby the neighbouring surface. The position of the smaller auxiliary magnet 24 exceeds the inner edge of the secondary drive magnet 22. The magnetic interaction force between adjacent lens modules 10 and 20 is adjusted by using the configuration of auxiliary magnets 24. The same polarity of the primary driving magnets 13, 23 and the secondary driving magnets 11, 121, 122, 21, 22 and the smaller auxiliary magnets 24 of the adjacent two lens modules 10, 20 are all directed toward the respective lens sides. When the distance between the two lens modules 10 and 20 is constant, part of the magnetic field of the primary driving magnets 23 passes through the space marked with distance "W2" (in Y-axis direction), which reduces the interference of magnetic forces between the primary driving magnets 23 and the auxiliary magnets 24, which is advantageous for product assembly. The small auxiliary magnet 24 has a distance "W4" (in Y-axis direction) from the secondary driving magnet 22, which may be equal to the distance "W1" between the primary driving magnets 23 and the secondary driving magnet 22, or other preferred distance. Since the auxiliary magnets 24 of the second lens module 20 is closer to the first lens module 10, the magnetic field is stronger, therefore the magnetic field lines of the auxiliary magnets 24 pass through the "W4" space and interact with the magnetic fields of the driving magnets 13, 121, 122 of the first lens module 10, so as to generate an interaction force to balance the forces with the secondary driving magnets 121, 122, 22 nearby the neighbouring surface. The interaction forces between the auxiliary magnets 24 and the primary driving magnets 13, 23 and the secondary driving magnets 121, 122, 22 is determined by the magnetic interference orientation between the magnetic fields of the two lens modules 10 and 20.

The invention reduces the mutual interference between the magnetic fields of two adjacent lens modules 10, 20 by adding additional auxiliary magnets 24 and/or applying the cut-off corner at secondary driving magnets 22, 121, 122 to balance the magnetic forces.

Figure 10B:
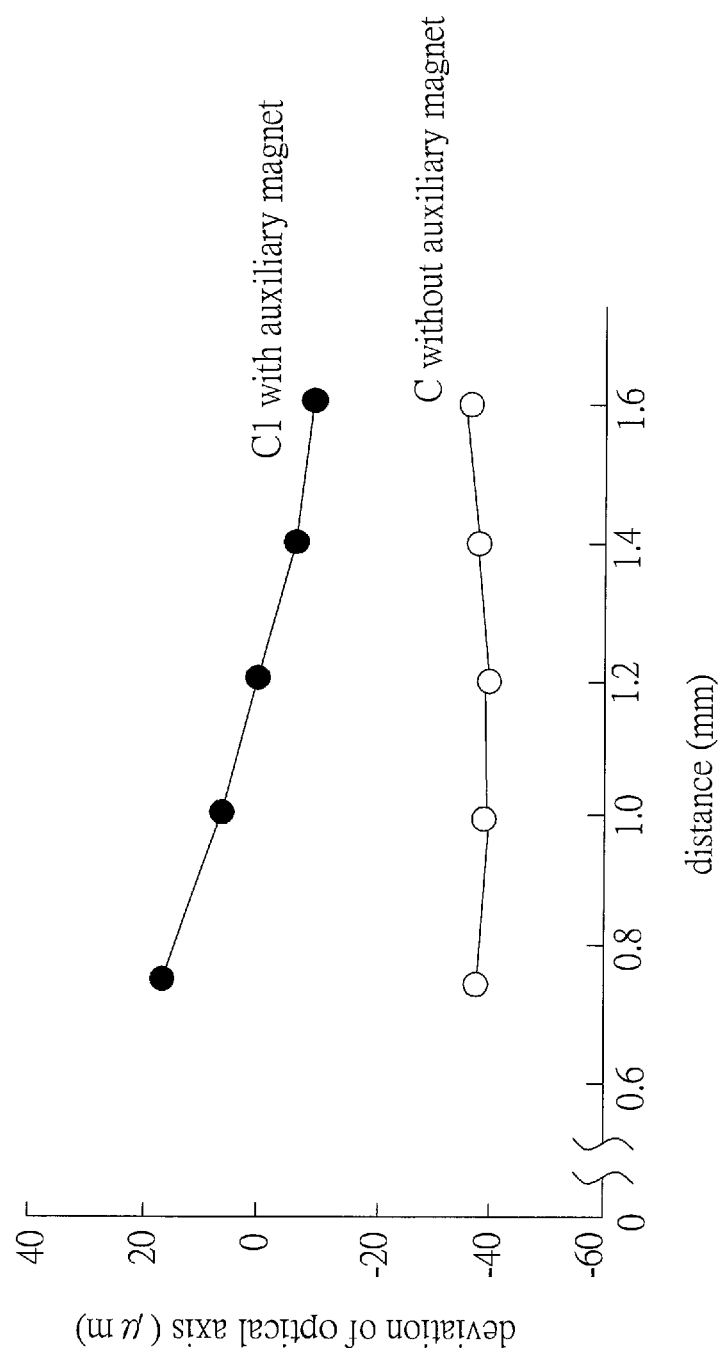
FIG. 10B is a curve diagram showing the test results of the deviations of optical axis caused by magnetic interference according to the multi-lens camera modules of the fifth preferred embodiment shown in FIG. 10A with or without auxiliary magnets.

Please refer to FIG. 10B, which is a curve diagram showing the test results of the deviations (e.g., displacement and/or tilt) of optical axis caused by magnetic interference according to the multi-lens camera modules of the fifth preferred embodiment shown in FIG. 10A with or without auxiliary magnets. From the curve diagram of FIG. 10B, the relationship between the deviation of optical axis and the distance between two lens modules 10, 20 (i.e., the distance of the gap between two lens modules 10, 20) can be seen. In which, curve line "C" represents the test result of the multi-lens camera module shown in FIG. 10A without any auxiliary magnets being furnished in the second lens module; in addition, curve line "C1" represents the test result of the multi-lens camera module of the fifth preferred embodiment shown in FIG. 10A, wherein at least one auxiliary magnet 24 is added at the spaces nearby the neighbouring surface between two ends of the secondary driving magnets 22 and an adjacent end of the primary driving magnet 23 of the second lens module 20. The same polarity of the primary driving magnets 13, 23 and the secondary driving magnets 11, 121, 122, 21, 22 and the smaller auxiliary magnets 24 of the adjacent two lens modules 10, 20 are all directed toward their respective lens sides. Considering that, the optical axis is not interfered by the magnetic interference when the deviation value of optical axis is equal to 0 μm. It is obvious that, the severity of deviation of optical axis caused by magnetic interference is less for the curve line "C1" (auxiliary magnets 24 included) than the curve line "C" (without auxiliary magnet) when the value of distance is the same. When the distance between two adjacent lens modules 10, 20 is between 1.0 mm to 1.4 mm, the value of deviation of optical axis is very close to 0 μm for the curve line "C1", which means there is almost no deviation of optical axis at all, and thus can be considered as the best mode of the invention (i.e., the multi-lens camera modules of the fifth preferred embodiment shown in FIG. 10A wherein the distance between two adjacent lens modules 10, 20 is between 1.0 mm to 1.4 mm).

The two lens modules 10 and 20 are arranged in a near-field position with a relatively close distance, and the optical axis deviation value driven by the influence of the magnetic force changes significantly in the positive direction. Therefore, under the small-sized structure of the electromagnetic driving system of the adjacent lens modules 10 and 20, at least one auxiliary magnet 24 is added to increase the interaction force, which helps to balance the distribution of magnetic interaction forces as well as to reduce the magnetic interference between the adjacent two lens modules 10 and 20.

The auxiliary magnets 24 described in the invention only provide the function to balance the magnetic fields, the purpose of these auxiliary magnets 24 is not to interact with the driving coil to generate pushing force, and thus do not influence the balance of pushing forces of original design. That is, the pushing forces for driving the lens support to move are mostly generated by the interactions between the primary driving magnets and the driving coil without the need of the interactions between the auxiliary magnets and the driving coil. Therefore, it is no need to consider how much pushing forces will be generated when designing and furnishing the auxiliary magnets 24. The shape, size and tolerance of the auxiliary magnet 24 are not restricted. The height and thickness of the auxiliary magnets 24 can be unequal with the primary driving magnets and secondary driving magnets. Under the limitations of current technologies in manufacturing the auxiliary magnet 24, magnets having different magnetic energies can be selected to balance the force and reduce the magnetic field interference. Because the size and shape of auxiliary magnet 24 can be different from other driving magnets 11, 121, 122, 13, 21, 22, 23, therefore, the auxiliary magnet 24 is configured to be flexible and simple to reduce the magnetic interference without being limited to the precision molding processes. By adding these smaller auxiliary magnets 24, the magnetic interference between two adjacent lens modules 10, 20 is reduced, such that the size or magnetic energy product of the secondary driving magnets 121, 122, 22 can be increased in order to improve the horizontal pushing forces along X-axis, so as to decrease the power consumption of the lens module. In a preferred embodiment, the auxiliary magnet 24 has a size smaller than ⅓ of the secondary driving magnet 22 of the second lens module 20, and is furnished at a location where cannot interact with the driving coil of AF and the horizontal coils of OIS (e.g., the height of the auxiliary magnet 24 is not high enough to interact with the driving coil, in addition, there is no horizontal coil below the auxiliary magnet 24).

Figure 11:
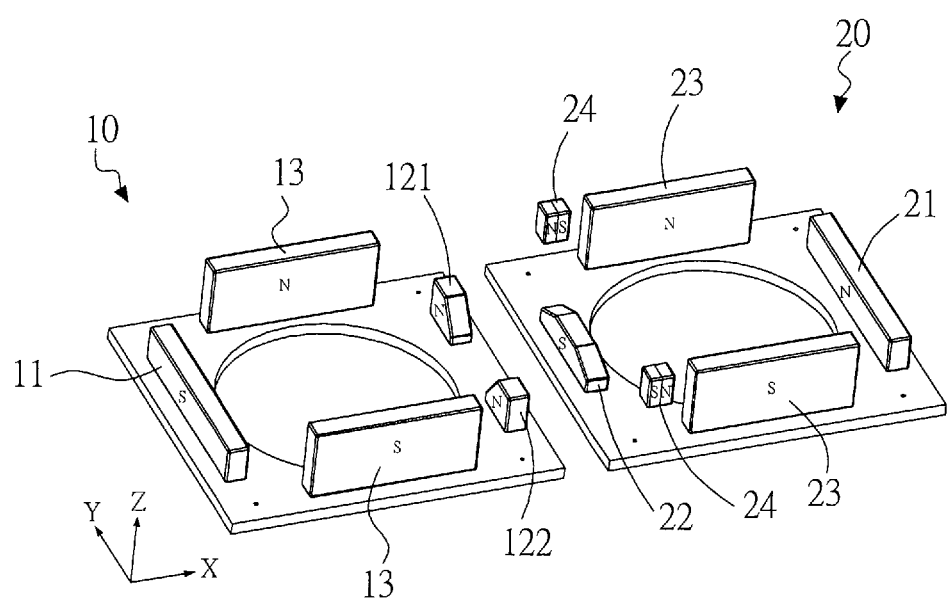
FIG. 11 is a schematic perspective diagram showing the configuration of driving magnets of two adjacent lens module of the sixth preferred embodiment of the multi-lens camera module in accordance with the present invention.

Please refer to FIG. 11, which is a schematic perspective diagram showing the configuration of driving magnets of two adjacent lens module of the sixth preferred embodiment of the multi-lens camera module in accordance with the present invention. The difference between the sixth preferred embodiment shown in FIG. 11 and the fifth preferred embodiment shown in FIG. 10A is that, the auxiliary magnets 24 of the sixth preferred embodiment shown in FIG. 11 is a multipolar magnet. The driving magnets of the adjacent two lens modules 10, 20 have the same polarity facing toward the lens side. The magnetization direction of the auxiliary magnet 24 is the same as that of the primary driving magnet 23, and is perpendicular to the optical axis and facing toward the lens side. The auxiliary magnet 24 is adjacent to the heteropolar of the primary driving magnet 23, such that magnetic interaction forces are generated between the auxiliary magnet 24 of second lens module 20 and the driving magnets 13, 121, 122 of first lens module 10. The distances between the auxiliary magnet 24 of second lens module 20 and the driving magnets 13, 121, 122 of first lens module 10 are near, therefore the magnetic interaction forces therebetween are strong, and thus can balance the magnetic interaction forces with the secondary driving magnets 121, 122, 22, so as to reduce the magnetic interference between two adjacent lens module 10, 20. The magnetic interaction forces generated between the auxiliary magnets 24 and other driving magnets 13, 23, 121, 122, 22 determine the orientation of magnetic interference between the adjacent lens modules 10, 20.

Figure 12:
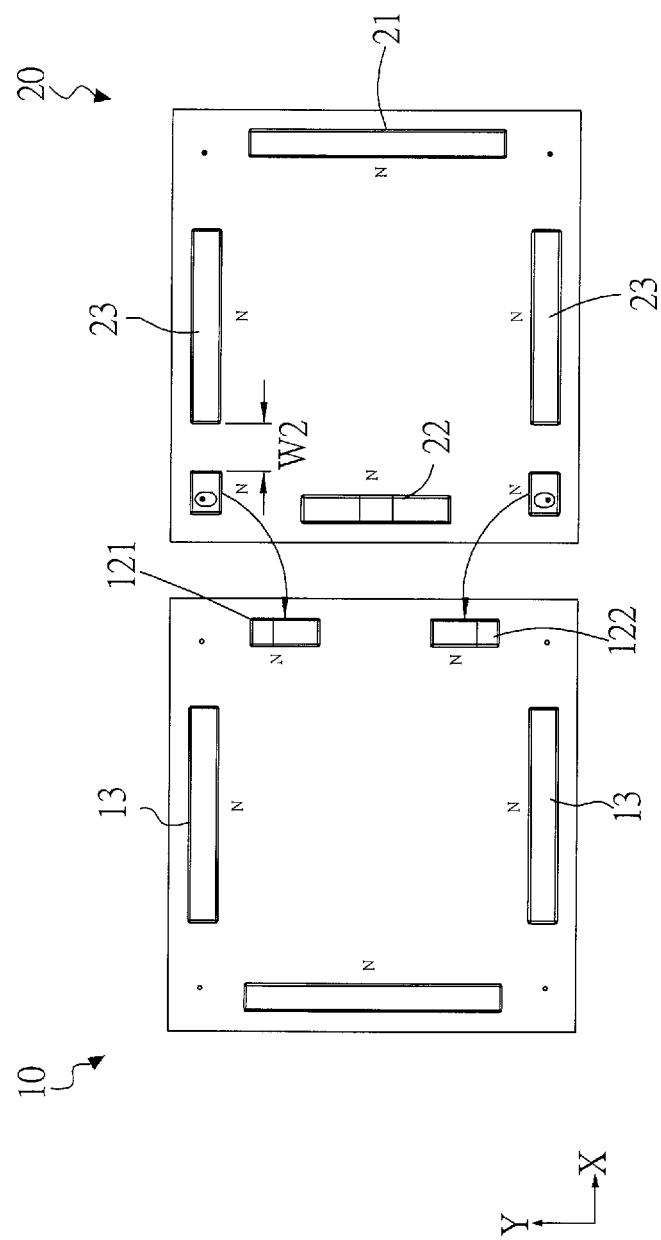
FIG. 12 is a schematic top view of the seventh preferred embodiment of multi-lens camera module in accordance with the present invention.

Please refer to FIG. 12, which is a schematic top view of the seventh preferred embodiment of multi-lens camera module in accordance with the present invention. In this seventh preferred embodiment, each one of the two adjacent lens modules 10, 20 has the same polarity of its driving magnets facing toward its lens. The difference between this seventh preferred embodiment and the fifth preferred embodiment shown in FIG. 10A is that, the auxiliary magnet 24 on the second lens module 20 is designed with either a notch or a through hole. In order to allow the adjacent two lens modules 10, 20 to have more magnetic interaction forces to be distributed within a limited interval, the position of auxiliary magnet 24 is moved toward the neighbouring surface to a position exceeding the inner surface of the secondary driving magnet 22 and therefore even near to the driving magnets 13, 121, 122 of first lens module 10, so as to increase the magnetic interaction forces therebetween. The position of auxiliary magnet 24 can overlap with the suspension wire, such that, the suspension wire can pass through the notch (or through hole) formed on the auxiliary magnet 24, so as to effectively use the limited inner space of OIS lens module, increase the magnetic interaction forces, and balance the magnetic interference between the lens modules 10, 20. The magnetization direction of the auxiliary magnet 24 is the same as that of the primary driving magnet 23, with their same polarity facing toward the lens. The magnetic field between the auxiliary magnet 24 of the second lens module 20 and the secondary driving magnets 121, 122, 22 is balanced, so as to improve the magnetic interference.

Figure 13A:
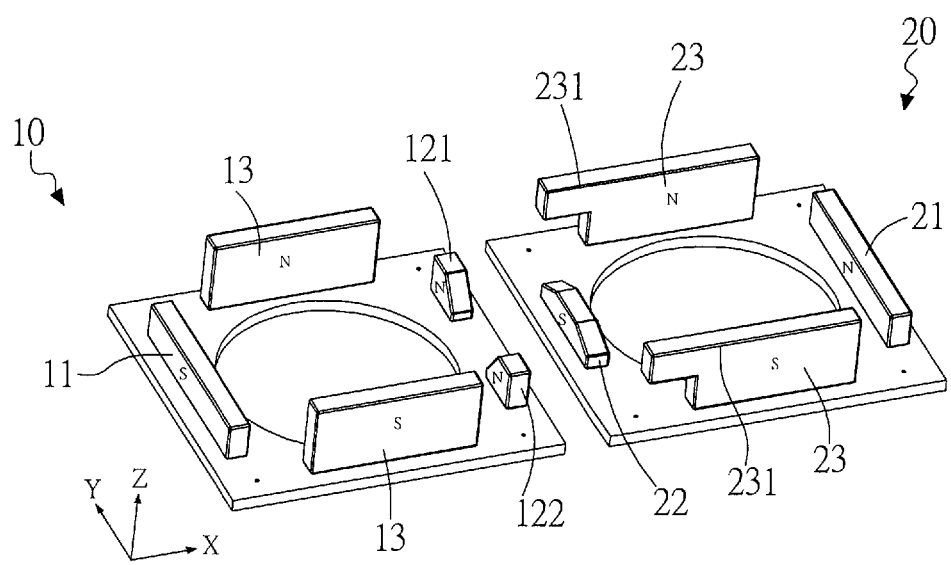
FIGS. 13A to 13D are the schematic perspective views of the configuration of driving magnets of two adjacent lens modules of the eighth to eleventh preferred embodiments of multi-lens camera module in accordance with the present invention.
Figure 13B:
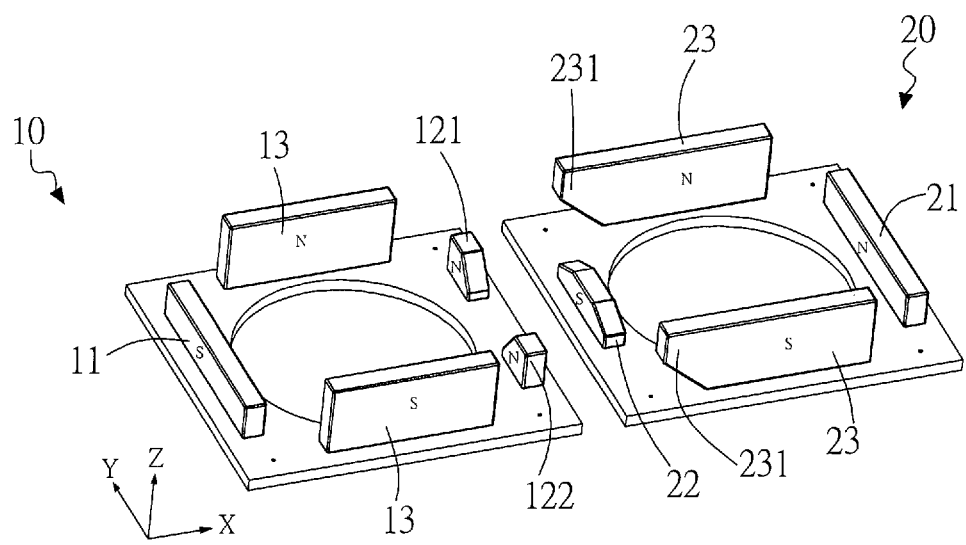
Figure 13C:
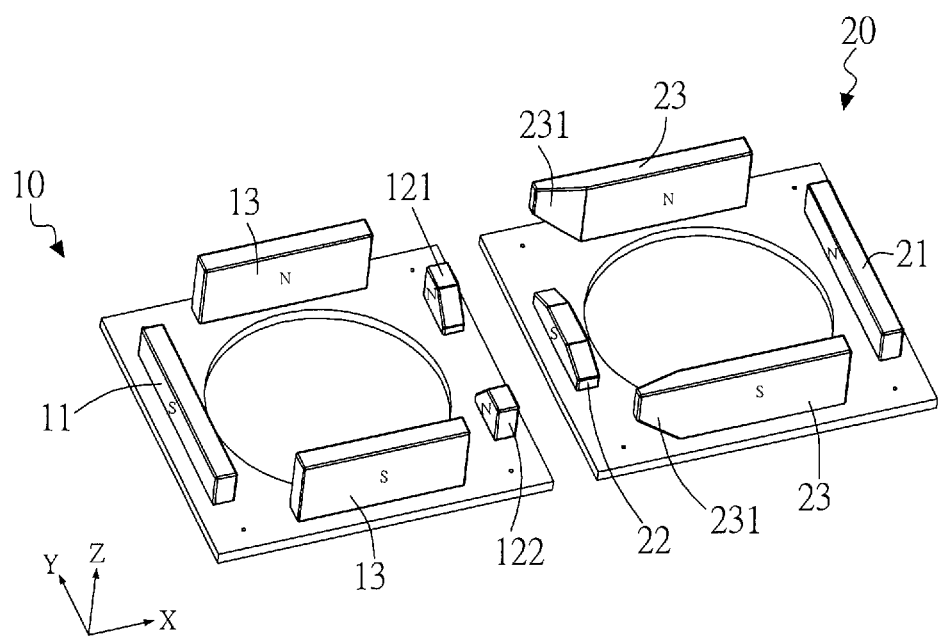
Figure 13D:
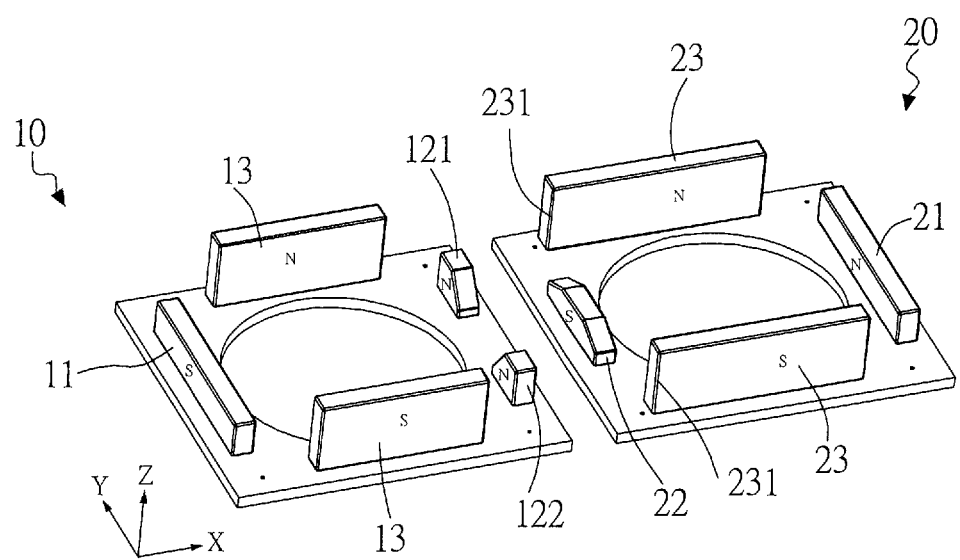

Please refer to FIGS. 13A to 13D, which are the schematic perspective views of the configuration of driving magnets of two adjacent lens modules of the eighth to eleventh preferred embodiments of multi-lens camera module in accordance with the present invention. In the eighth to eleventh preferred embodiments, the plurality of driving magnets of each lens module have the same polarity facing toward the lens side. The difference between the eighth to eleventh preferred embodiments shown in FIGS. 13A to 13D and the fifth preferred embodiment shown in FIG. 10A is that, each of the primary driving magnets 23 of second lens module 20 is designed with an extended portion 231 extending from one lateral edge of the primary driving magnets 23 toward the neighbouring surface, therefore, because the extended portion 231 is even nearer to the first lens module 10, stronger magnetic interaction force can be generated. In addition, because of the novel configuration of the unequal length of the upper and lower edges of the secondary driving magnet 22, the magnetic field lines of the extended portion 231 of primary driving magnets 23 can more easily pass through the cut-off corner of secondary driving magnet 22 to reach the first lens module 10, so as to balance the magnetic interaction forces of the secondary driving magnets 121, 122, 22 and reduce the magnetic interference. The pattern of projection of the primary driving magnet 23 on the X-Z plane includes at least one pair of opposite edges (upper edge and lower edge) with unequal length. The opposite edges (upper edge and lower edge) are divided by the optical axis into two line segments. The difference between the lengths of the paired opposite edges (the longer upper edge and the shorter lower edge) is more than 10% of the shorter lower edge. The size of the extended portion 231 can be smaller or thinner than the other parts of the primary driving magnets 23, in order to provide a gentle and gradual magnetic field force. The shape of the extended portion 231 can be, but not limited to, one of the following: a rectangular body having smaller height as shown in FIG. 13A, a trapezoid body gradually decreasing in height as shown in FIG. 13B, a wedged body gradually decreasing both in height and thickness as shown in FIG. 13C, and a rectangular body having the same height and thickness as the other parts of the primary driving magnets 23 as shown in FIG. 13D. In the embodiment shown in FIG. 13C, the opposite edges (upper edge and lower edge) are divided by the optical axis into two line segments. Because the shape of the extended portion 231 is a wedged body gradually decreasing both in height and thickness, therefore a pattern of projection of the primary driving magnet 23 on a plane defined by the X-axis and the Y-axis will include at least one pair of opposite edges with unequal length, and the difference between the lengths of the paired opposite edges of the primary driving magnet 23 is more than 10%.

Figure 14:
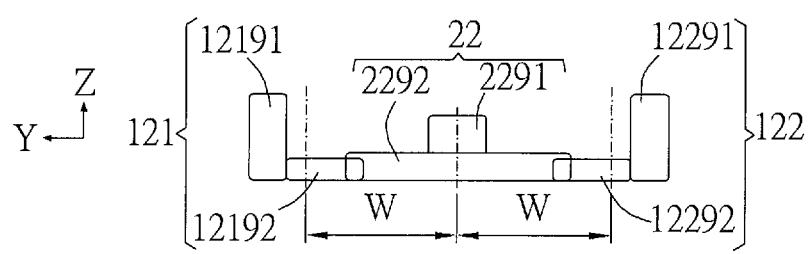
FIG. 14 is a schematic diagram of the pattern of projection of the secondary driving magnets of two adjacent lens modules on the neighbouring surface of the twelfth preferred embodiment of multi-lens camera module in accordance with the present invention.

Please refer to FIG. 14, which is a schematic diagram of the pattern of projection of the secondary driving magnets of two adjacent lens modules on the neighbouring surface of the twelfth preferred embodiment of multi-lens camera module in accordance with the present invention. As shown in FIG. 14, the patterns of projections of the secondary driving magnets 121, 122, 22 of two adjacent lens modules on the neighbouring surface each includes a pair of opposite edges (upper edge and lower edge) with unequal lengths, in addition, the unequal lengths of paired opposite edges (upper edge and lower edge) of each secondary driving magnets 121, 122, 22 can be formed by assembling several small magnets 12191, 12192, 12291, 12292, 2291, 2292 which are independent and simple in configuration (for example, block type). By assembling these independent and simply configured small magnets 12191, 12192, 12291, 12292, 2291, 2292 to produce the secondary driving magnets 121, 122, 22 having unequal lengths of paired opposite edges (upper edge and lower edge), not only the production of these secondary driving magnets is simplified, the production loss of asymmetrical shaped magnets is prevented, but also the assembly and production processes are facilitated.

Figure 15A:
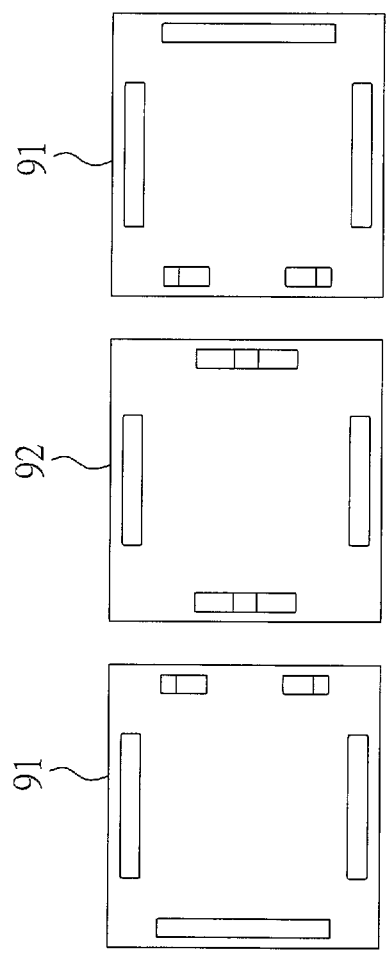
FIG. 15A to FIG. 15C are the schematic top views of various embodiments of the multi-lens camera module having more than two lens modules with different configurations in accordance with the present invention.
Figure 15B:
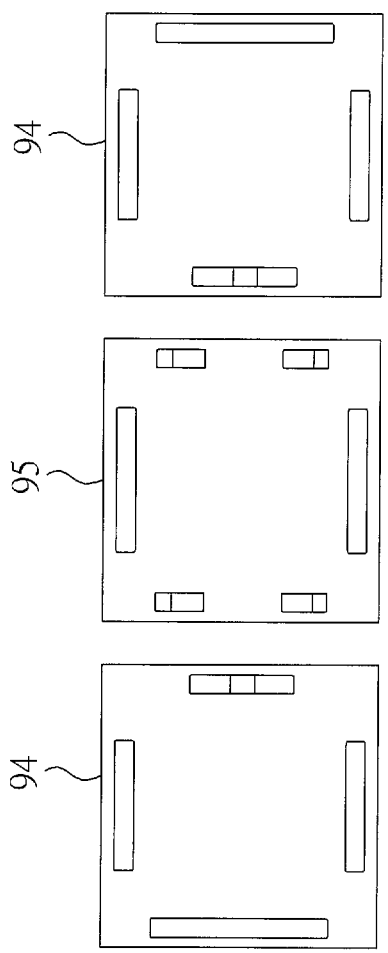
Figure 15C:
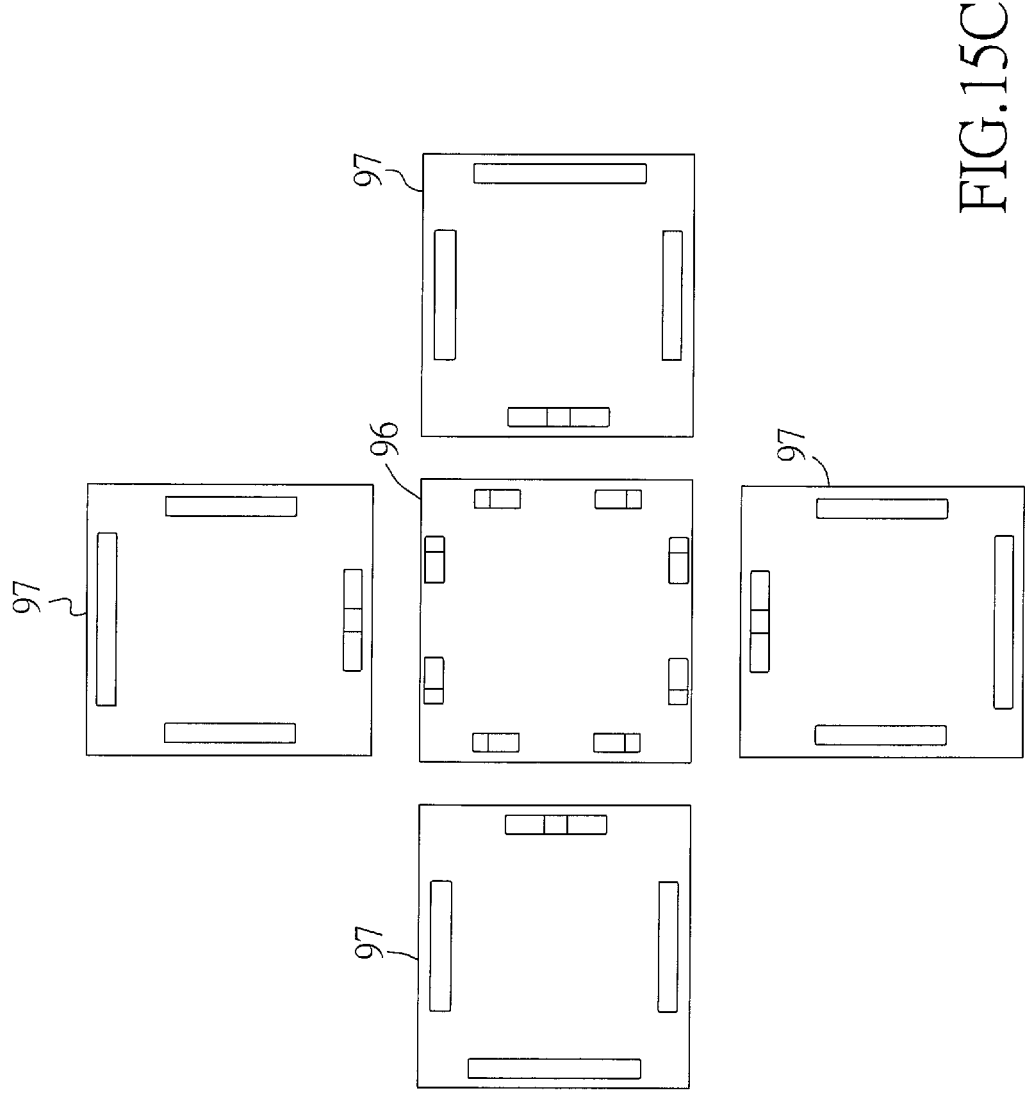

Please refer to FIG. 15A to FIG. 15C, which respectively are the schematic top views of various embodiments of the multi-lens camera module having more than two lens modules with different configurations in accordance with the present invention. As shown in FIG. 15A to FIG. 15C, it is understood that the amount of the lens modules of the multi-lens camera module is not limited to two, the multi-lens camera module of the present invention may also include three (see FIG. 15A), four (see FIG. 15B), five (see FIG. 15C) or even more lens modules 91, 92, 94, 95, 96, 97 with the same or different structures.

The implementation of electromagnetic driving system of the multi-lens camera module of the present invention, no matter it is including a plurality of OIS lens modules assembled adjacently, or a plurality of AF lens modules adjacent to each other, or a combination of an OIS lens module and an AF lens module assembled adjacently, the performance of low magnetic interference can always be achieved through the various novel configurations of driving magnets disclosed in the present invention. No matter the lens module is a spring type or a ball type lens module, it is within the scope of implementation of the present invention.

In the embodiments previously described in the present invention, such as the auxiliary magnet added near to the neighbouring surface at a predetermined distance apart from the primary driving magnet shown in FIG. 10A, and the extended portion of primary driving magnet extending toward the neighbouring surface shown in FIG. 13A to FIG. 13D, the magnetic interference between adjacent lens modules is balanced by arranging the optimum distance between the primary driving magnet (or auxiliary magnet) and the neighbouring surface for generating appropriate magnetic interaction forces. When the distance between two magnets decreases, the magnetic interaction force therebetween increases. There is an interaction force between the secondary driving magnets positioned at two sides of the neighbouring surface, while there is another interaction force between the primary driving magnet of one lens module and the other driving magnets of another lens module located at the other side of the neighbouring surface. If the extended portion of the primary driving magnet is extending toward the neighbouring surface, a stronger magnetic interaction force will be obtained at an inner side of the secondary driving magnets across the neighbouring surface. If there is sufficient distance "W1" within the path of magnetic field lines, then sufficient magnetic interaction force can be obtained between the primary driving magnet (or auxiliary magnet) and the other driving magnets located in another lens module across the neighbouring surface, such that the magnetic interaction force between adjacent lens modules can be balanced, and the magnetic interference can be reduced.

Figure 16A:
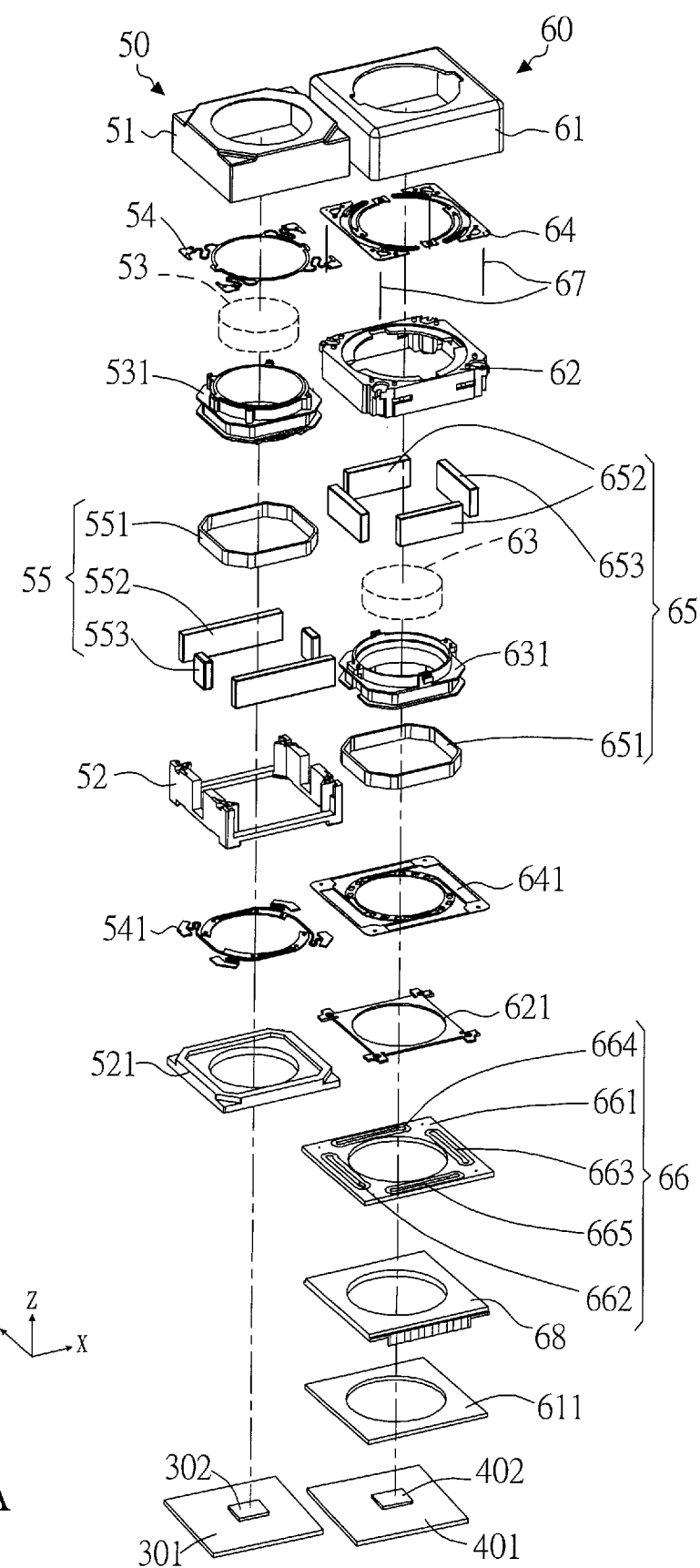
FIG. 16A and FIG. 16B are the perspective explosive view of two adjacent lens modules of the thirteenth preferred embodiment of multi-lens camera module in accordance with the present invention, and the schematic top view of the configuration of driving magnets of the thirteenth preferred embodiment.
Figure 16B:
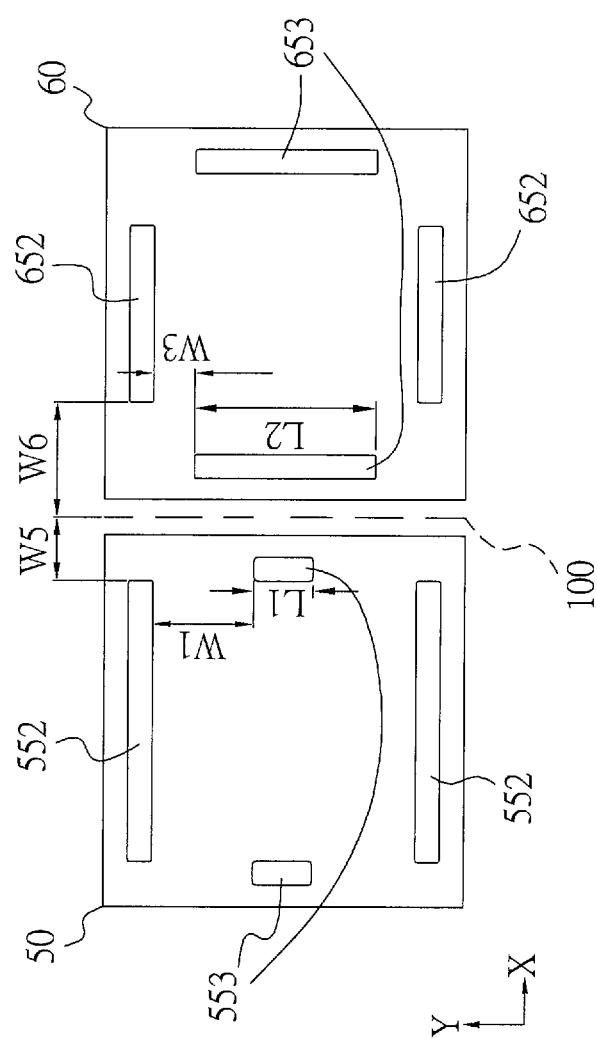

An embodiment meets the previous described magnetic interaction forces is shown in FIG. 16A and FIG. 16B, which respectively are the perspective explosive view of two adjacent lens modules of the thirteenth preferred embodiment of multi-lens camera module in accordance with the present invention, and the schematic top view of the configuration of driving magnets of the thirteenth preferred embodiment. The thirteenth preferred embodiment shown in FIG. 16A and FIG. 16B especially refers to a multi-lens camera module which includes a first lens module 50 with only the AF function and a second lens module with both the OIS and AF functions. There is a gap between the adjacent first lens modules 50 (with AF only) and second lens module 60 (with both OIS and AF), and the center of the distance of gap (i.e., the middle area of the gap) is called as the neighbouring surface 100.

Each of the first and second lens modules 50, 60 respectively has an optical axis and is defined with an X-axis, a Y-axis and Z-axis. The optical axis is parallel to the Z-axis, while the X-axis, a Y-axis and Z-axis are perpendicular to each other. The neighbouring surface 100 is parallel to the plane defined by Y-axis and Z-axis. In the preferred embodiment, the first lens module 50 and the second lens modules 60 each comprises the following components: a cover 51, 61, a frame 52, 62, a lens 53, 63 mounted in a lens support 531, 631, at least one elastic member (including upper elastic member 54, 64 and lower elastic member 541, 641), and a first driving system 55, 65. The second lens module 60 further comprises: a second driving system 66, a plurality of suspension wires 67, and a connecting board 68.

The cover 51, 61 has a through hole. The frame 52, 62 is located in the cover 51, 61 and forms an inner compartment therein. The lens 53, 63 together with the lens support 511, 631 are received within the inner compartment of the frame 52, 62. The outer rim and inner rim of the elastic members (including upper elastic member 54, 64 and lower elastic member 541, 641) are respectively fixed on a top surface and a bottom surface of the frame 52, 62 and the lens support 511, 631. The positioning plate 521, 621 clamp and fix the lower elastic member 541, 641 to the bottom side of the frame 52, 62. Such that, the lens 53, 63 (together with the lens support 531, 631) are retained inside the inner compartment and movable along the optical axis.

The first driving system 55, 65 comprises: at least one driving coil 551, 651 and a set of two corresponding primary driving magnets 552, 652. In which, the driving coil 551, 651 is wound around the outer periphery of the lens support 531, 631 of lens 53, 63, and is corresponding to the driving magnets (including primary driving magnets 552, 652) mounted on the frame 52, 62, so as to act as the electromagnetic driving device of AF for providing driving forces along Z-axis. The driving coil 551, 651 is a ring-typed monopole coil in this embodiment, but can also be one of the following: a ring-typed bipolar coil, a flat-typed bipolar coil, or a printed circuit board (PCB) having a coil circuit. Each of the first lens module 50 and second lens module 60 is equipped with an external circuit 301, 401. The external circuit 301, 401 is located below the lens module 50, 60 and is furnished with an image sensor 302, 402 for accepting the external image light from the lens 53, 64 of the lens module 50, 60 and transforming the accepted image light into electric signals readable by computers.

In this thirteenth preferred embodiment, because the first lens module 50 do not have OIS, so it does not need the secondary driving magnet. However, the first lens module 50 is furnished with two small auxiliary magnets 552 whose size is smaller than ¼ of the primary driving magnet 552 in order to reduce the magnetic interference. On the other hand, because the second lens module has OIS function, so it is equipped with at least two secondary driving magnets 653, and the size of the secondary driving magnet 653 is equal to or smaller than the primary driving magnet 652. Wherein, the auxiliary magnet 553 of the first lens module 50 is located nearby one side of the neighbouring surface 100, in addition, the secondary driving magnet 653 of the second lens module 60 is located nearby the other side of the neighbouring surface 100.

The second driving system 66 of second lens module 60 at least comprises: a circuit board 661 and at least two horizontal coils 662, 663, 664, 665. These horizontal coils 662, 663, 664, 665 are furnished on the circuit board 661 and are respectively corresponding to the two primary driving magnets 652 and the two secondary driving magnets 653, so as to act as the electromagnetic driving device of OIS for providing horizontal driving forces along X-axis and Y-axis. The connecting board 68 is electrically connecting with both the circuit board 661 and the external circuit 401. The external circuit 401 is located below the frame 62 and is furnished with the image sensor 402 and other related electronic components. The suspension wires 67 provide the functions of elastic suspension and electric conductivity. These suspension wires 67 suspend the frame 62, the lens support 631 (together with the lens 63) and the elastic members 64, 641 above the top side of the circuit board 361, 461. The bottom plate 611 is fixed to the bottom side of the cover 61.

As shown in FIG. 16A and FIG. 16B, the first lens module 50 includes at least one smaller auxiliary magnet 553 at a side nearby one side of the neighbouring surface 100, while the other side of the neighbouring surface 100 is furnished with at least one secondary driving magnet 653 of the second lens module 60. These driving magnets (including the primary driving magnets 552, 652 and the secondary driving magnets 653) and the auxiliary magnets 553 have a unipolar magnetic field direction facing toward their respective lens 53, 63.

Each one of the primary driving magnets 552, 652 of these two adjacent lens modules 50, 60 is respectively mounted on a side of frame 52, 62 perpendicular to the neighbouring surface 100. The auxiliary magnet 553 is mounted on a middle point of another side of frame 52 nearby the neighbouring surface 100. The purpose of the auxiliary magnets 553 is to balance the magnetic interaction force and reduce the magnetic interference, but not to interact with the driving coil 551 to generate pushing force. That is, the pushing forces for driving the lens support 531 to move are mostly generated by the interactions between the primary driving magnets 552 and the driving coil 551 without the need of the interactions between the auxiliary magnets 553 and the driving coil 551. Therefore, it is no need to consider how much pushing forces will be generated when designing and furnishing the auxiliary magnets 553. The primary driving magnets 552 of the first lens module 50 interact with the driving coil 551 wound around the lens to generate electromagnetic forces to push the lens 53 to move along the optical axis in order to provide AF function. The driving magnets (including primary driving magnets 652 and secondary driving magnets 653) of the second lens module 60 are mounted on four sides of the frame 62, which not only can interact with the driving coil 651 to generate electromagnetic forces pushing the lens 63 to move along the optical axis for providing AF function, but also can interact with the horizontal coils 662, 663, 664, 665 to generate horizontal pushing forces to move the lens 63 along the X-axis and Y-axis for providing OIS function.

When viewing toward the neighbouring surface 100 from a direction perpendicular to the neighbouring surface 100, the projection of auxiliary magnet 553 on the neighbouring surface 100 is overlapped with a middle portion of the secondary driving magnet 653 located at the other side of the neighbouring surface 100. The configuration of the smaller auxiliary magnet 553 and the secondary driving magnet 653 located at two sides of the neighbouring surface 100 can generate a magnetic interaction force. The lateral length "L1" of the auxiliary magnet 553 is smaller than the lateral length "L2" of the secondary driving magnet 653. The distance "W1" (along Y-axis) between the end of the auxiliary magnet 553 and the primary driving magnet 552 of first lens module 50 is larger than the distance "W3" (along Y-axis) between the end of the secondary driving magnet 653 and the primary driving magnet 652 of second lens module 60. The length of the primary driving magnet 552 of the first lens module 50 extends and exceeds an inner surface of the auxiliary magnet 553 facing toward the lens. The distance "W5" between the end of the primary driving magnet 552 of first lens module 50 and the neighbouring surface 100 is smaller than another distance "W6" between the end of the secondary driving magnet 652 of second lens module 60 and the neighbouring surface 100. The projections of the primary driving magnets 552 and the auxiliary magnets 553 of first lens module 50 on the X-Z plane are partially overlapped. A multi-lens camera module with low magnetic interference can be obtained by using the magnetic interaction forces between these magnets 552, 553, 652, 653.

In the first lens module 50, the side which is away from the neighbouring surface 100 can be either furnished with an auxiliary magnet as shown in FIG. 16B, or furnished with an auxiliary magnet on the lens for corresponding to a position sensor, or furnished with no magnet.

Figure 17A:
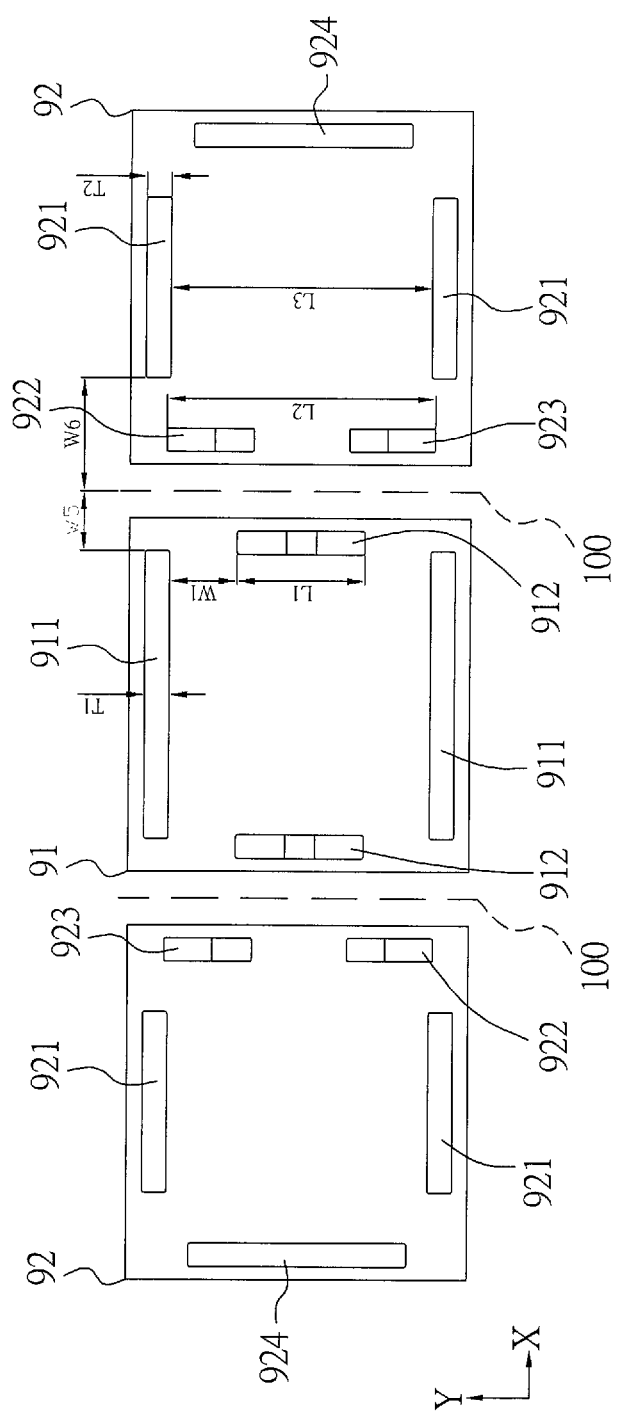
FIG. 17A, FIG. 17B and FIG. 17C are the schematic top views of the configuration of the driving magnets of three adjacent lens modules of the fourteenth, fifteenth and sixteenth preferred embodiments of multi-lens camera module in accordance with the present invention.
Figure 17B:
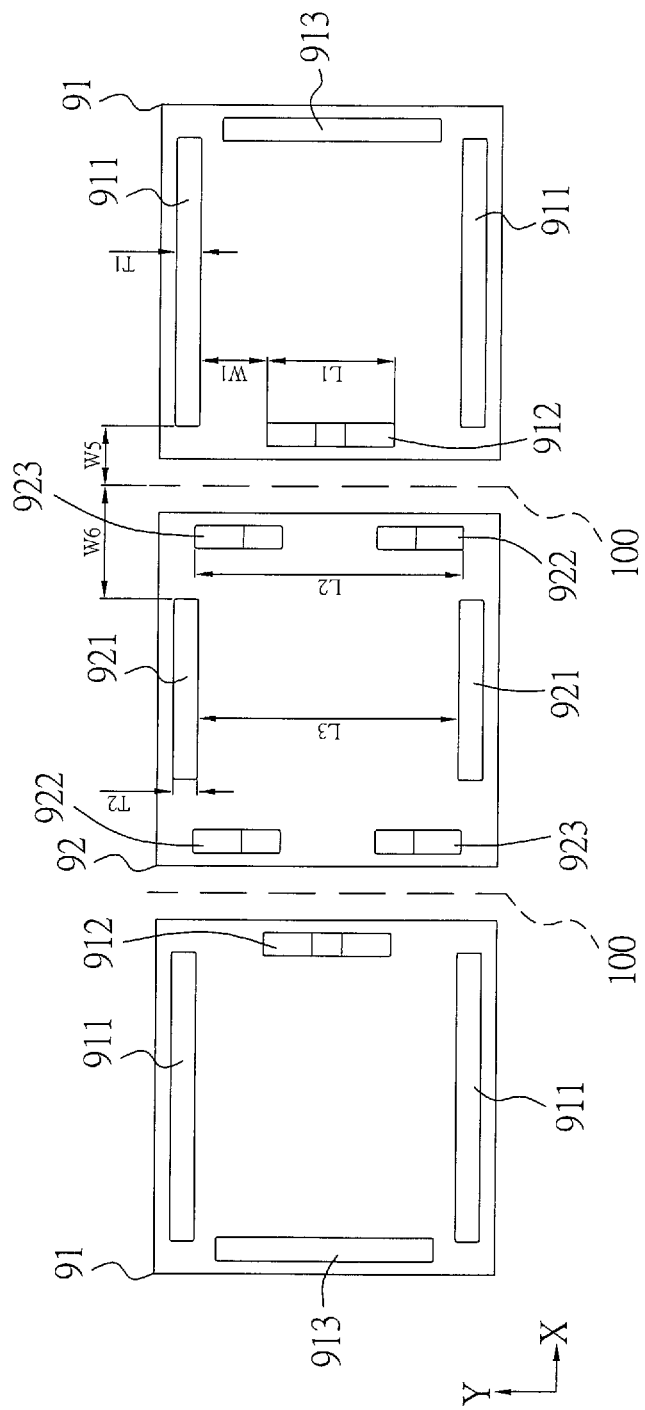
Figure 17C:
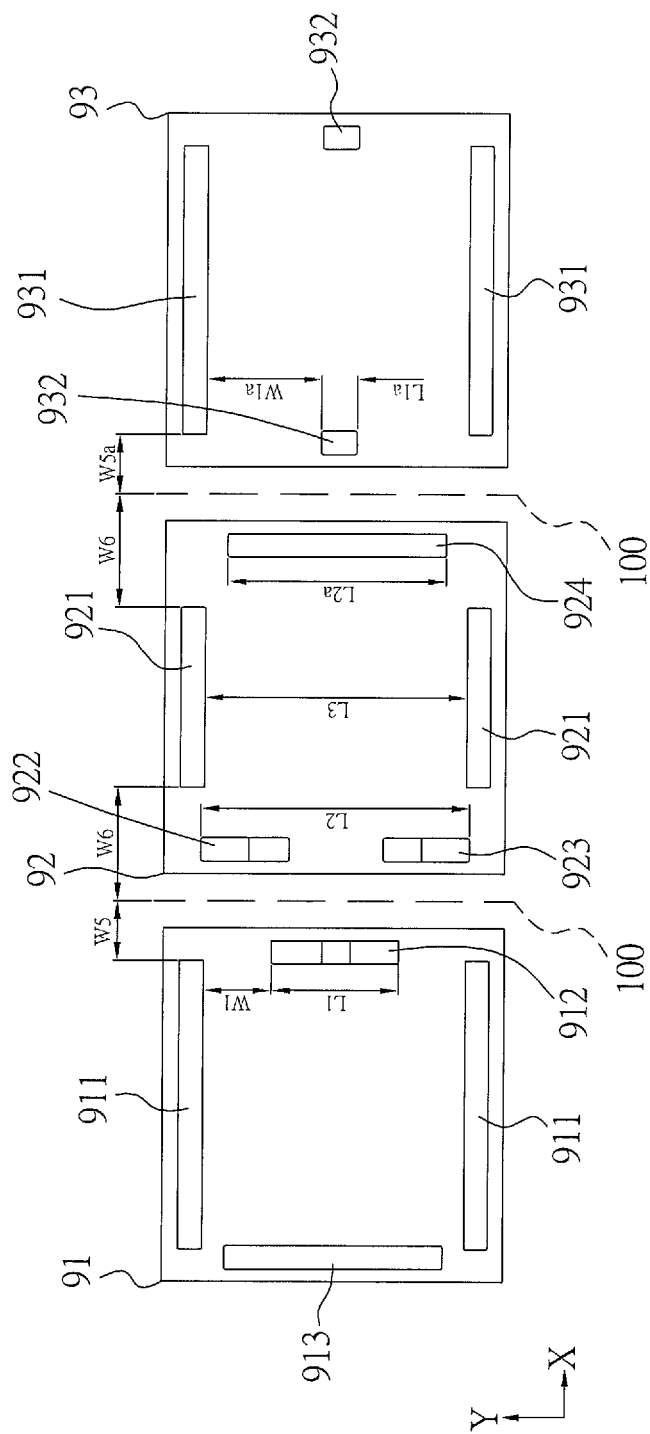

Refer to FIG. 17A, FIG. 17B and FIG. 17C, which respectively are the schematic top views of the configuration of the driving magnets of three adjacent lens modules of the fourteenth, fifteenth and sixteenth preferred embodiments of multi-lens camera module in accordance with the present invention.

In the fourteenth preferred embodiment shown in FIG. 17A, the three lens modules 91, 92 arranged in a row include a first lens module 91 located at middle and two second lens modules 92 respectively located at the left and right sides of the first lens module 91. Two neighbouring surfaces 100 are located respectively between two sides of the first lens module 91 and the two second lens modules 92. The secondary driving magnets 912, 922, 923 of each lens module 91, 92 of multi-lens camera module are arranged across the neighbouring surface 100 along the Y-axis in a staggered manner. The length "L1" of the secondary driving magnet 912 of first lens module 91 is shorter than the length "L2" of the covering range of the two secondary driving magnets 922, 923 located at the other side of the neighbouring surfaces 100. There is a distance "W1" between the end of the secondary driving magnet 912 and the primary driving magnet 911 of the first lens module 91. The length of the primary driving magnet 911 of first lens module 91 is longer than the primary driving magnet 921 of second lens module 92. In addition, the length "L2" of the covering range of the two secondary driving magnets 922, 923 of second lens modules 92 is also longer than the primary driving magnets 921 of second lens modules 92. There is another secondary driving magnet 924 located at another side of the second lens module 92 away from the neighbouring surface 100, whose length can be about equal to the sum of the lengths or sizes of the two secondary driving magnets 922, 923, or is about equal to the length or size of the primary driving magnet 921.

This embodiment achieves the effect of balanced magnetic interaction forces by increasing the length of the primary driving magnet 911 of first lens module 91 and the covering range of the secondary driving magnets 922, 923 of second lens module 92 nearby the neighbouring surface 100. More particularly, one end of the primary driving magnet 911 of first lens module 91 is extending along X-axis to exceed an inner side of the secondary driving magnet 912 nearby the neighbouring surface 100; the distance "W5" between the end of the primary driving magnet 911 and the neighbouring surface 100 is shorter than the distance "W6" between the end of the primary driving magnet 921 and the neighbouring surface 100. The projections of the primary driving magnets 911 and the secondary driving magnets 912 of first lens module 91 on the X-Z plane are partially overlapped.

The length "L2" of the covering range of the secondary driving magnets 922, 923 of second lens module 92 is longer than the distance "L3" between the inner surfaces of the two opposite primary driving magnets 921. Which means, the covering ranges of the outer ends of the secondary driving magnets 922, 923 are extending and exceeding the inner surfaces of primary driving magnets 921 facing toward the lens. The projections of the primary driving magnets 921 and the secondary driving magnets 922 of second lens module 92 on the neighbouring surface 100 are partially overlapped. When viewing from a direction perpendicular to the neighbouring surface, projections of the secondary driving magnets 912, 922, 923 on the neighbouring surface 100 are partially overlapped. The effect of low magnetic interference of the multi-lens camera module is achieved by balancing the magnetic interaction forces between these driving magnets 911, 912, 921, 922, 923.

In the fifteenth preferred embodiment shown in FIG. 17B, the three lens modules 91, 92 arranged in a row include a second lens module 92 located at middle and two first lens modules 91 respectively located at the left and right sides of the second lens module 92. Two neighbouring surfaces 100 are located respectively between two sides of the second lens module 92 and the two first lens modules 91. The secondary driving magnets 912, 922, 923 of each lens module 91, 92 of multi-lens camera module are arranged across the neighbouring surface 100 along the Y-axis in a staggered manner. The length "L1" of the secondary driving magnet 912 of first lens module 91 is shorter than the length "L2" of the covering range of the two secondary driving magnets 922, 923 located at the other side of the neighbouring surfaces 100. There is a distance "W1" between the end of the secondary driving magnet 912 and the primary driving magnet 911 of the first lens module 91. The length of the primary driving magnet 911 of first lens module 91 is longer than the primary driving magnet 921 of second lens module 92. In addition, the length "L2" of the covering range of the two secondary driving magnets 922, 923 of second lens modules 92 is also longer than the primary driving magnets 921 of second lens modules 92. There is another secondary driving magnet 913 located at another side of the first lens module 91 away from the neighbouring surface 100, whose length can be about equal to the length or size of the secondary driving magnet 912.

This embodiment achieves the effect of balanced magnetic interaction forces by increasing the length of the primary driving magnet 911 of first lens module 91 and the covering range of the secondary driving magnets 922, 923 of second lens module 92 nearby the neighbouring surface 100. More particularly, one end of the primary driving magnet 911 of first lens module 91 is extending along X-axis to exceed an inner side of the secondary driving magnet 912 nearby the neighbouring surface 100; the distance "W5" between the end of the primary driving magnet 911 and the neighbouring surface 100 is shorter than the distance "W6" between the end of the primary driving magnet 921 and the neighbouring surface 100. The projections of the primary driving magnets 911 are overlapped with the secondary driving magnet 912 and another secondary driving magnet 913 of first lens module 91 on the X-Z plane.

The length "L2" of the covering range of the secondary driving magnets 922, 923 of second lens module 92 is longer than the distance "L3" between the inner surfaces of the two opposite primary driving magnets 921. Which means, the covering ranges of the outer ends of the secondary driving magnets 922, 923 are extending and exceeding the inner surfaces of primary driving magnets 921 facing toward the lens. The projections of the primary driving magnets 921 and the secondary driving magnets 922, 923 of second lens module 92 on the neighbouring surface 100 are partially overlapped. When viewing from a direction perpendicular to the neighbouring surface, projections of the secondary driving magnets 912, 922, 923 on the neighbouring surface 100 are partially overlapped. The effect of low magnetic interference of the multi-lens camera module is achieved by balancing the magnetic interaction forces between these driving magnets 911, 912, 921, 922, 923.

In the sixteenth preferred embodiment shown in FIG. 17C, the three lens modules 91, 92, 93 arranged in a row include a first lens module 91, a second lens module 92 located at middle and a third lens modules 93, and the structures of these three lens modules 91, 92, 93 are different. Two neighbouring surfaces 100 are located respectively between two sides of the second lens module 92 and the first and third lens modules 91, 93. Wherein, the first and second lens modules 91, 92 have both the AF and OIS functions, and thus include primary driving magnets 911, 921 and secondary driving magnets 912, 913, 922, 923, 924. The third lens module 93 only has the AF function and without the OIS function, and thus does not include the secondary driving magnet; in this embodiment, the third lens module 93 includes the primary driving magnets 931 for providing the pushing forces of AF and the auxiliary magnet 932 which are not for providing the pushing forces.

In the sixteenth preferred embodiment, The length "L1" of the secondary driving magnet 912 of first lens module 91 is shorter than the length "L2" of the covering range of the two secondary driving magnets 922, 923 located at the other side of the neighbouring surfaces 100. In the meantime, the length "L1a" of the auxiliary magnet 932 of third lens module 93 is also shorter than the length "L2a" of the covering range along Y-axis of the other secondary driving magnet 924 of second lens module 92 located at the other side of the neighbouring surfaces 100.

There is a distance "W1" between the end of the secondary driving magnet 912 and the primary driving magnet 911 of the first lens module 91. There is another distance "W1a" between the end of the auxiliary magnet 932 and the primary driving magnet 931 of the third lens module 93. The distance "W5" between the end of the primary driving magnet 911 and the neighbouring surface 100 is shorter than the distance "W6" between the end of the primary driving magnet 921 and the neighbouring surface 100. In addition, the distance "W5a" between the end of the primary driving magnet 931 and the neighbouring surface 100 is also shorter than the distance "W6" between the end of the primary driving magnet 921 and the neighbouring surface 100. Another difference between the sixteenth preferred embodiment shown in FIG. 17C and the embodiments shown in FIG. 17A and FIG. 17B is that, in the sixteenth preferred embodiment, the auxiliary magnet 932 of the third lens module 93 is corresponding to the secondary driving magnet 924 of the second lens module 92 across the neighbouring surface 100, and the projection of the auxiliary magnet 932 on the neighbouring surface 100 is overlapped with the middle portion of the secondary driving magnet 924. The third lens module 93 having the auxiliary magnet 932 only has the AF function.

Figure 18A:
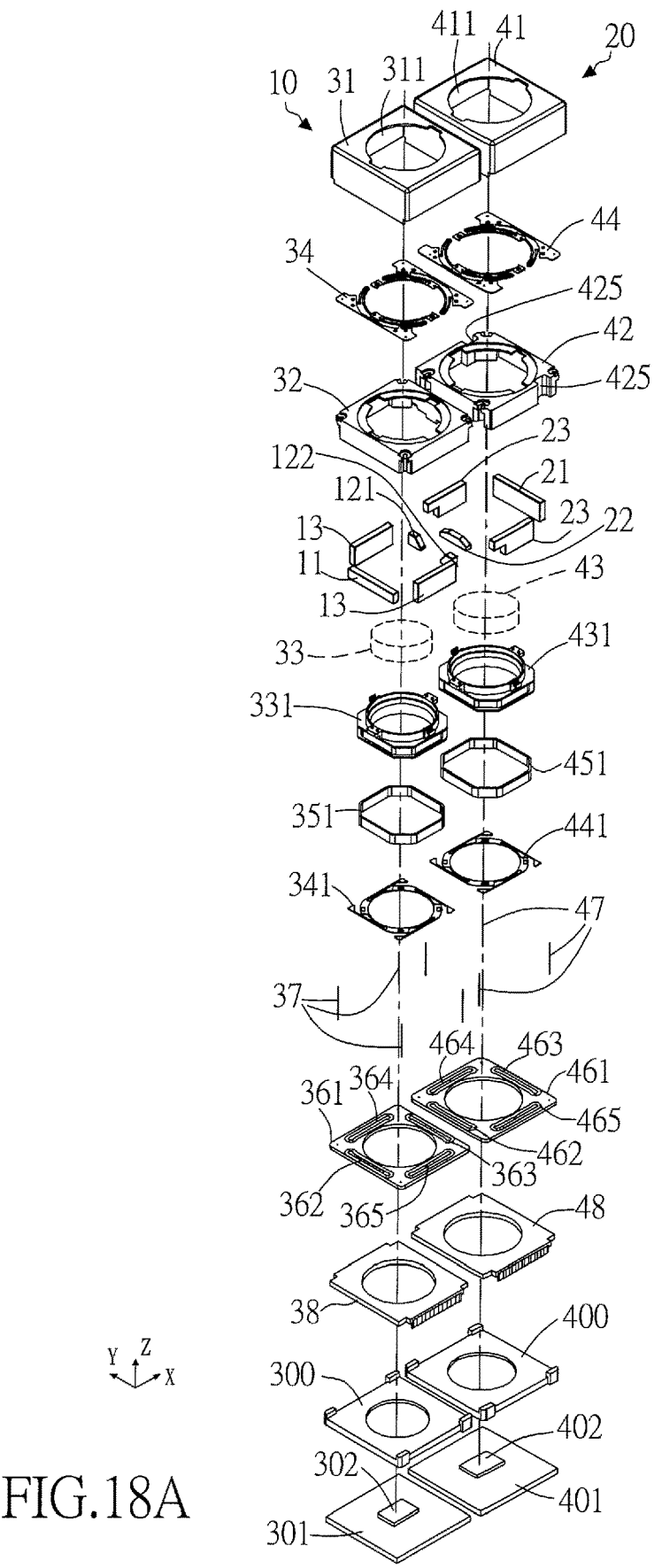
FIG. 18A, FIG. 18B and FIG. 18C are the three-dimensional explosion view, the side view of some components and the E-E sectional view of the seventeenth preferred embodiment of the multi-lens camera module (illustrated by a camera module having two lens modules) in accordance with the present invention.
Figure 18B:
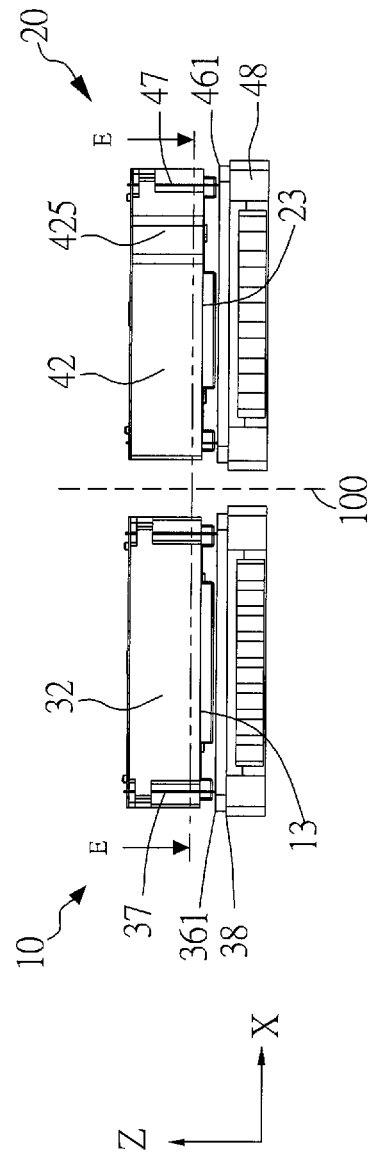
Figure 18C:
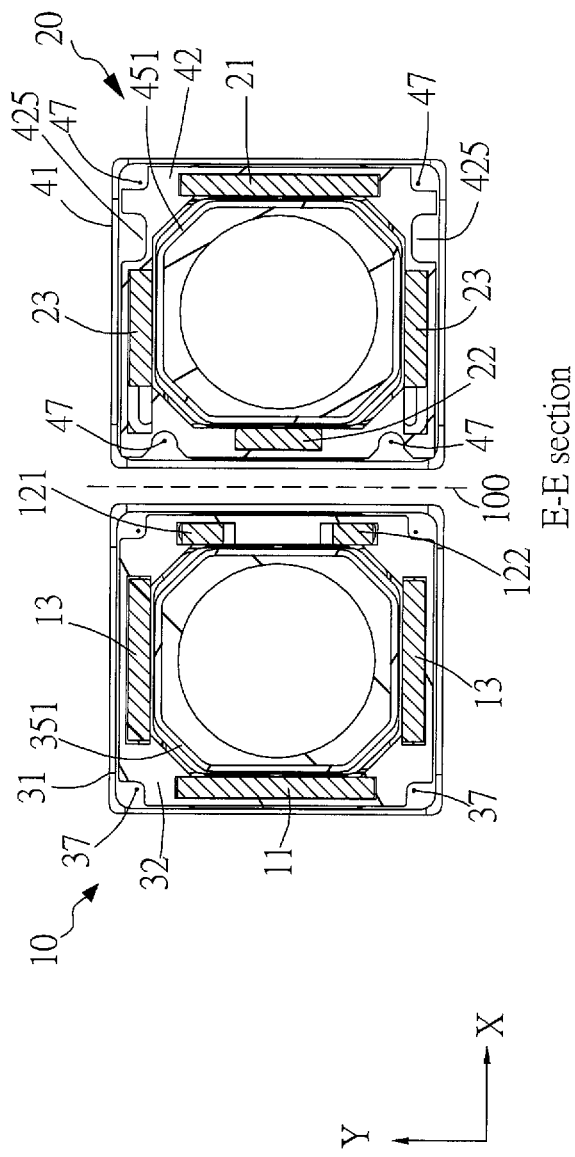

Please refer to FIG. 18A, FIG. 18B and FIG. 18C, which respectively are the three-dimensional explosion view, the side view of some components and the E-E sectional view of the seventeenth preferred embodiment of the multi-lens camera module (illustrated by a camera module having two lens modules) in accordance with the present invention.

Because most components of the seventeenth preferred embodiment of multi-lens camera module shown in FIG. 18A are the same with those illustrated in the first preferred embodiment shown in FIG. 3A, therefore, same or similar components will be assigned with the same component names and numerals, and no detailed descriptions will be provided. Only the differences of the seventeenth preferred embodiment will be described in detail. That is, alike the one previously illustrated in FIG. 3A, the basic structure of the multi-lens camera module of the seventeenth preferred embodiment shown in FIGS. 18A, 18B and 18C also comprises at least a first lens module 10 and a second lens module 20 located at two sides of a neighbouring surface 100. There is a gap between these two adjacent lens modules 10 and 20, and the center of the distance of the gap (i.e., the middle area of the gap) is called as the neighbouring surface 100. Each of the first and second lens modules 10, 20 respectively has an optical axis and is defined with an X-axis, a Y-axis and Z-axis. The optical axis is parallel to the Z-axis, while the X-axis, a Y-axis and Z-axis are perpendicular to each other. The neighbouring surface 100 is parallel to the plane defined by Y-axis and Z-axis. In the preferred embodiment, the first lens module 10 and the second lens modules 20 each comprises at least some of the following components: a cover 31, 41, a frame 32, 42, a lens 33, 43 mounted in a lens support 331, 431, at least one elastic member (including upper elastic member 34, 44 and lower elastic member 341, 441), a first driving system, a second driving system, a plurality of suspension wires 37, 47, and a connecting board 38, 48.

The cover 31, 41 has a through hole 311, 411. The frame 32, 42 is located in the cover 31, 41 and forms an inner compartment therein. The lens 33, 43 together with the lens support 311, 431 are received within the inner compartment of the frame 32, 42. The elastic members (including upper elastic member 34, 44 and lower elastic member 341, 441) are fixed on a top surface and a bottom surface of the frame 32, 42. The lens 33, 43 (together with the lens support 331, 431) are retained inside the inner compartment and movable along the optical axis.

The first driving system 35, 45 comprises: at least one driving coil 351, 451, a set of two corresponding primary driving magnets 13, 23 and at least two secondary driving magnets 11, 121, 122, 21, 22. In which, the driving coil 351, 451 is wound around the outer periphery of the lens support 331, 431 of lens 33, 43, and is corresponding to the driving magnets (including primary driving magnets 13, 23 and secondary driving magnets 11, 121, 122, 21, 22) mounted on the frame 32, 42, so as to act as the electromagnetic driving device of AF for providing driving forces along Z-axis.

The second driving system 36, 46 at least comprises: a circuit board 361, 461 and at least two horizontal coils 362, 363, 364, 365, 462, 463, 464, 465. These horizontal coils 362, 363, 364, 365, 462, 463, 464, 465 are furnished on the circuit board 361, 461 and are respectively corresponding to the two primary driving magnets 13, 23 and those secondary driving magnets 11, 121, 122, 21, 22, so as to act as the electromagnetic driving device of OIS for providing horizontal driving forces along X-axis and Y-axis.

The connecting board 38, 48 is electrically connecting with both the circuit board 361, 461 and an external circuit 301, 401. The external circuit 301, 401 is located below the frame 32, 42 and is furnished with an image sensor 302, 402. The suspension wires 37, 47 provide the functions of elastic suspension and electric conductivity. These suspension wires 37, 47 suspend the frame 32, 42, the lens support 331, 431 (together with the lens 33, 43) and the elastic members 34, 341, 44, 441 above the top side of the circuit board 361, 461. The bottom plate 300, 400 is furnished below the circuit board 361, 461 and is fixed to the bottom side of the cover 31, 41, so as to accommodate all the aforementioned components between the cover 31, 41 and bottom plate 300, 400.

In this seventeenth preferred embodiment, one or more position sensors (such as Hall sensor) can be furnished at either the circuit board 361, 461 or connecting board 38, 48 in order to detect the position of the lens support 331, 431 and the lens 33, 43 received therein relative to the frame 32, 42 along the optical axis (Z-axis), or/and to detect the position of the frame 32, 42 and the lens 33, 43 received therein relative to the circuit board 361, 461 along the horizontal directions (X-axis and Y-axis), in order to provide feedbacks of closed-loop control for AF or/and OIS functions.

In the seventeenth preferred embodiment, the at least two secondary driving magnets comprise: secondary driving magnets 11, 121, 122, 21, 22. The first lens module 10 is adjacent to the second lens module 20, in addition, there is a neighbouring surface 100 located between the first and second lens modules 10, 20. The two secondary driving magnets 121, 122 of the first lens module 10 and the secondary driving magnets 22 of the second lens module 20 are nearby and staggered across the neighbouring surface 100 along the Y-axis direction of the multi-lens camera module. That is, although these three secondary driving magnets 121, 122, 22 are located at two sides of the neighbouring surface 100, however, the projections of these secondary driving magnets 121, 122, 22 on the neighbouring surface 100 are arranged staggeredly along the Y-axis direction in an order of the secondary driving magnet 121, the secondary driving magnet 22 and the secondary driving magnet 122; and moreover, the projections of these secondary driving magnets 121, 122 and 22 on the neighbouring surface 100 do not completely overlap with each other.

In the seventeenth preferred embodiment, the structures of the secondary driving magnets 121, 122, 22 of the two adjacent lens modules 10, 20 are similar to those of the second preferred embodiment shown in FIG. 4A and FIG. 7. That is, the patterns of projections of the secondary driving magnets 121, 122, 22 of first lens module 10 and second lens module 20 on the neighbouring surface 100 each includes a pair of opposite edges (upper edge 1213, 1223, 2201 and lower edge 1214, 1224, 2202) having unequal lengths. The beveled configuration (i.e., cut-off corner) of each of the secondary driving magnets 121, 122, 22 is formed by connecting at least one oblique line segment (i.e., slope section 1212, 1222, 2203, 2204) at both ends of the paired opposite edges (upper and lower edges 1213, 1214, 1223, 1224, 2201, 2202), wherein, the difference of lengths between the shorter upper edge 1213, 1223, 2201 and the longer lower edge 1214, 1224, 2202 is greater than 20%. By using the configurations that the lengths of upper edge 1213, 1223, 2201 are shorter than the lengths of lower edge 1214, 1224, 2202 of the secondary driving magnets 121, 122, 22 nearby the neighbouring surface 100 of the first and second lens modules 10, 20, and two ends of the upper edge 1213, 1223, 2201 and lower edge 1214, 1224, 2202 are connected by slope section 1212, 1222, 2203, 2204 to form cut-off corners thereat, the magnetic energies and interaction forces between different magnetic fields can be reduced, and the magnetic interference can also be reduced. Furthermore, the length of lower edge 1214, 1224, 2202 of secondary driving magnet 121, 122, 22 is longer for interacting with the horizontal coil so as to maintain sufficient horizontal pushing forces along X-axis and Y-axis. The novel design of the configuration of secondary driving magnets 121, 122, 22 of this second preferred embodiment can significantly reduce the magnetic interference under the same power consumption.

In the seventeenth preferred embodiment, the structure of the primary driving magnets 23 of the second lens modules 20 is similar to that of the eighth preferred embodiment shown in FIG. 13A. That is, each of the primary driving magnets 23 of second lens module 20 is designed with an extended portion extending from one lateral edge of the primary driving magnets 23 toward the neighbouring surface 100, therefore, because the extended portion is even nearer to the first lens module 10, stronger magnetic interaction force can be generated. In addition, because of the novel configuration of the unequal length of the upper and lower edges of the secondary driving magnet 22, the magnetic field lines of the extended portion of primary driving magnets 23 can more easily pass through the cut-off corner of secondary driving magnet 22 to reach the first lens module 10, so as to balance the magnetic interaction forces of the secondary driving magnets 121, 122, 22 and reduce the magnetic interference. The pattern of projection of the primary driving magnet 23 on the X-Z plane includes at least one pair of opposite edges (upper edge and lower edge) with unequal length. The opposite edges (upper edge and lower edge) are divided by the optical axis into two line segments. The difference between the lengths of the paired opposite edges (the longer upper edge and the shorter lower edge) is more than 10% of the shorter lower edge. The size of the extended portion can be smaller or thinner than the other parts of the primary driving magnets 23, in order to provide a gentle and gradual magnetic field force.

Furthermore, it can be seen from FIG. 18A and FIG. 18B that, the design of the four suspension wires 47 of the second lens module 20 is also different and novel. Because the two primary driving magnets 23 of the second lens module 20 has an additional extended portion extending toward the neighbouring surface 100, the suspension wires 47 which should originally be positioned at corners of the frame 42 of second lens module 20 will be influenced. Therefore, the suspension wires 47 which located at the upper and lower ends of the secondary driving magnet 22 near to the neighbouring surface 100 (i.e., the two suspension wires 47 located at left side of secondary driving magnet 22) are not located right at the corners, but are slightly shifted to positions slightly near to two ends of the secondary driving magnet 22, in order to avoid the extended portion of the primary driving magnets 23. That is, the length of the secondary driving magnet 22 located at the left side of second lens module 20 near to the neighbouring surface 100 is shorter, thereby leaves a space at both upper and lower ends of the secondary driving magnet 22 for furnishing the suspension wires 47, such that the two suspension wires 47 located at left side of secondary driving magnet 22 are not located right at the corners. As a result, the furnishing locations of the four suspension wires 47 of the second lens module 20 are not complete symmetry (the locations of the two suspension wires 47 near to the neighbouring surface 100 are slightly moved toward the upper and lower ends of the secondary driving magnet 22, not located at the corners of the frame 42; however, the other two suspension wires 47 away from the neighbouring surface 100 are located right at the corners of the frame 42), so as to satisfy the extension structure of the primary driving magnet 23 and balance the magnetic interaction forces of the two lens modules 10 and 20.

Figure 19A:
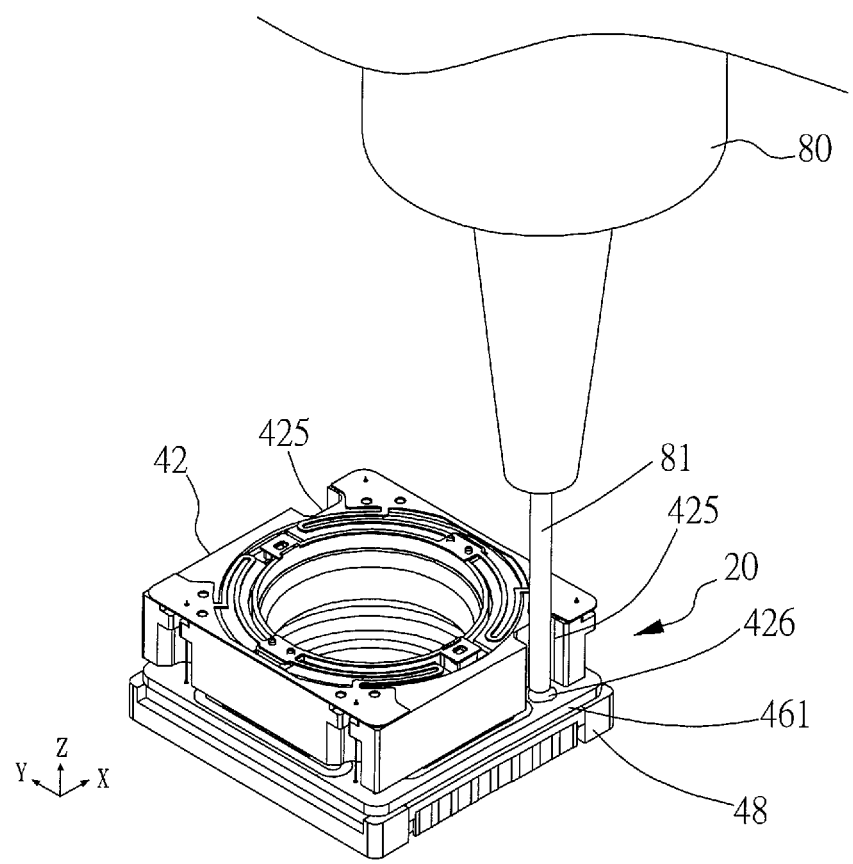
FIG. 19A and FIG. 19B are the schematic side view and perspective view of the second lens module during the dispensing process of the seventeenth preferred embodiment of multi-lens camera module shown in FIG. 18A to FIG. 18C.
Figure 19B:
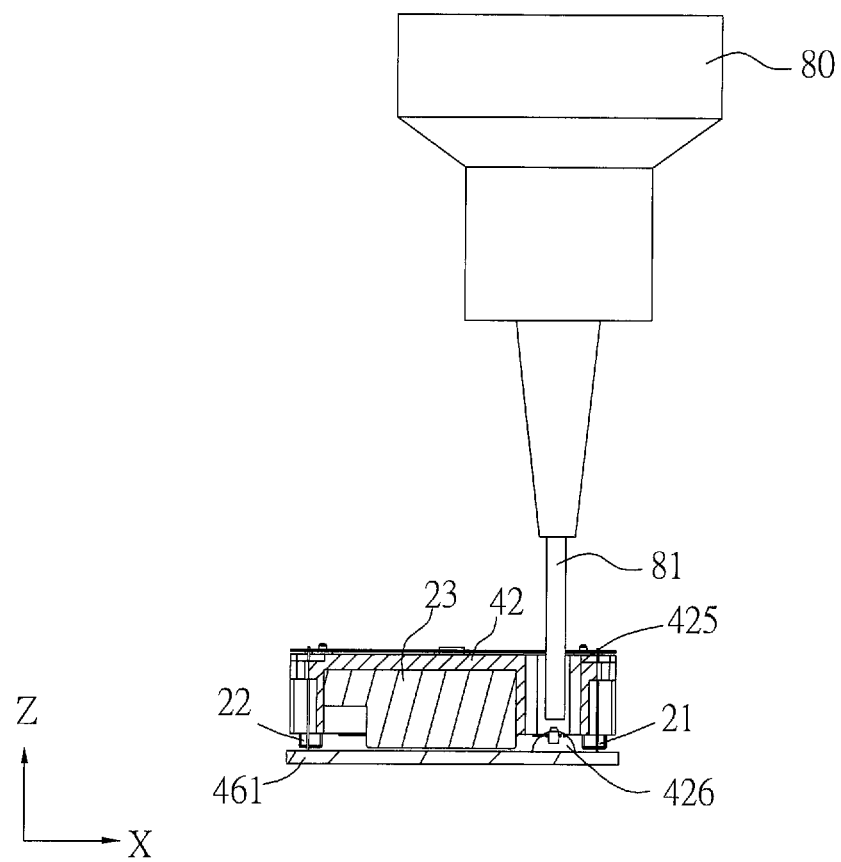

Please refer to FIG. 19A and FIG. 19B, which respectively are the schematic side view and perspective view of the second lens module during the dispensing process of the seventeenth preferred embodiment of multi-lens camera module shown in FIG. 18A to FIG. 18C.

Due to the design of lens modules having OIS system for use in smart phones has a tendency to miniaturize the structural design, the maximum width of lens module in the horizontal directions of the X-axis and the Y-axis is usually only about 6-12 mm, and the maximum height in the Z-axis direction is only between 2-5 mm; therefore, the miniaturized parts inside the lens module are not only small in size, but also have a small distance between the parts. As a result, it becomes very difficult to perform a dispensing process of applying a damping medium such as, but not limited to, a damping soft gel, in a conventional lens module 10 having OIS system.

In order to resolve the aforementioned difficulty, the multi-lens camera module of the present invention is especially furnished with a plurality of notch spaces 425 extending downward (in the Z-axis direction) from the upper surface of the frame 42 of the first and second lens modules (taking the second lens module 20 as example). The bottom area of each notch space 425 is the place at which the damping medium 426 is expected to be applied. When viewing from a direction parallel to the optical axis, as shown in FIG. 18C, there is a relatively larger space between the driving magnets 21, 23 of the second lens module 20. The frame 42 is formed with at least one penetrating notch space 425 disposed corresponding to the relatively larger space between adjacent driving magnets 21, 23. Thereby, during the dispensing process of the second lens module 20, the probe 81 of the damping medium dispensing device 80 can be easily inserted into the frame 42 from the top to bottom (that is, in the Z-axis direction) of the notch space 425, in order to apply the damping medium 426 at the bottom of each notch space 425 in such a manner that, a portion of the damping medium 426 is in contact with (attached to) the bottom surface of the frame 42, while another portion of the damping medium 426 is in contact with (attached to) the upper surface of the circuit board 426. Moreover, the light curing device (not shown) of damping medium may also be directly irradiated downward from the top side of the lens module 20 for curing and thickening the fluid-like damping medium 426, so as to provide the function of damping. Such novel structural design of the notch space 425 not only provides a single axial (Z-axis direction) operation to apply and cure the damping medium 426 in a straightforward manner parallel to the optical axis to save production time, but also the pitch of the arrangement between the production trays is reduced. In addition, the problems of insufficient curing of damping medium due to the curing light being blocked by the crowded components of the lens module, the time required in the curing process is long, and difficult to control the stability of the characteristic of power consumption can all be resolved.

While the present invention has been particularly shown and described with reference to some preferred embodiments, it will be understood by those skilled in the art that various changes in form and detail may be achieved without departing from the spirit and scope of the present invention.

What is claimed is:

1. A multi-lens camera module, comprising at least a first lens module and a second lens module adjacent to the first lens module; there being a gap between the first lens module and the second lens module; a center of the distance of the gap being called as a neighbouring surface; the first lens module and the second lens module being located at two sides of the neighbouring surface; each of the first lens module and the second lens module respectively having an optical axis and being defined with an X-axis, a Y-axis and a Z-axis; the optical axis being parallel to the Z-axis; the X-axis, the Y-axis and the Z-axis being perpendicular to each other; the neighbouring surface being parallel to a plane defined by the Y-axis and the Z-axis; wherein, the first lens module and the second lens modules each comprises:
    a cover;
    a frame, located in the cover and forming an inner compartment therein;
    a lens, furnished in the inner compartment of the frame; and
    a first driving system, comprising a driving coil and a plurality of driving magnets; wherein the driving coil is wound around an outer periphery of the lens and is corresponding to the driving magnets mounted on the frame to provide driving forces along the Z-axis;
    wherein, the plurality of driving magnets of the first lens module comprises two primary driving magnets opposite to each other; the plurality of driving magnets of the second lens module comprises two primary driving magnets opposite to each other and at least one secondary driving magnet; the size of the secondary driving magnet is smaller than the primary driving magnet of the second lens module; in addition, a side of the second lens module nearby the neighbouring surface is furnished with the secondary driving magnet, while a side of the first lens module nearby the neighbouring surface is not furnished with the primary driving magnet of the first lens module;
    wherein, the driving magnets of the second lens module further comprises at least one small auxiliary magnet mounted on the frame; the auxiliary magnet is located at the side of the second lens module nearby the neighbouring surface; the auxiliary magnet is positioned between the secondary driving magnet and the primary driving magnet of the second lens module; the position of the small auxiliary magnet exceeds an inner edge of the secondary drive magnet nearby the neighbouring surface; the same polarity of the primary driving magnet, the secondary driving magnet and the small auxiliary magnets of the second lens module are all facing toward the lens of the second lens module.

2. The multi-lens camera module of claim 1, wherein:
    the plurality of driving magnets of the first lens module further comprises at least one secondary driving magnet; in addition, each one of the first lens module and the second lens module has at least one of the secondary driving magnet located at the side nearby the neighbouring surface; each said secondary driving magnet has a central axis parallel to the optical axis, and there is a distance between two of said central axes;
    the secondary driving magnets are arranged across the neighbouring surface along the Y-axis in a staggered manner;
    a projection on the neighbouring surface of said secondary driving magnets located nearby the neighbouring surface includes at least one said secondary driving magnet which has unequal lengths of two opposite edges along either the Y-axis or the Z-axis.

3. The multi-lens camera module of claim 2, wherein at least one of the first lens module and the second lens module further comprises a second driving system;
    said second driving system comprises:
    a circuit board, said circuit board being furnished with at least two horizontal coils which are corresponding to the driving magnets for providing horizontal pushing forces;
    a plurality of suspension wires, providing functions of elastic suspension and electric conductivity; these suspension wires suspending the frame, the lens and at least one elastic member above the circuit board;
    at least one position sensor, located below the driving magnets and being electrically connected with the circuit board; and
    an external circuit, located below the frame and connected with the circuit board, said external circuit being furnished with an image sensor;
    wherein, the lens is received by a lens support and is movable together with the lens support.

4. The multi-lens camera module of claim 3, wherein said position sensor is furnished on the external circuit; in addition, at least one of the first lens module and the second lens module is furnished with at least one sensing magnet; the sensing magnet is furnished at a side of the outer periphery of the lens and is corresponding to one of said at least one position sensor located on the external circuit.

5. The multi-lens camera module of claim 2, wherein the size of the secondary driving magnet of one of said lens modules located nearby the neighbouring surface is smaller than the size of another said secondary driving magnet of the same lens module located away from the neighbouring surface.

6. The multi-lens camera module of claim 2, wherein the ends of the two opposite edges with unequal lengths of the secondary driving magnet are connected by at least one of the following: slope section, arc section and right angle section.

7. The multi-lens camera module of claim 6, wherein a difference of lengths between the two opposite edges with unequal lengths of said secondary driving magnet is greater than 20%.

8. The multi-lens camera module of claim 2, wherein the secondary driving magnets belonging to said lens modules are arranged across the neighbouring surface along the Y-axis in a staggered manner that, the projections of these secondary driving magnets on the neighbouring surface do not completely overlap with each other or even are completely without any overlap at all; in addition, said multi-lens camera module comprises one of the following: at least one of said lens modules having optical image stabilizer (OIS) function, at least one of said lens modules having auto-focusing (AF) function, at least one of said lens modules having both OIS and AF functions; moreover, the first lens module and the second lens module is one of the following: a spring type lens module or a ball type lens module.

9. The multi-lens camera module of claim 1, wherein the small auxiliary magnet is a multipolar magnet.

10. The multi-lens camera module of claim 1, wherein the small auxiliary magnet is formed with either a notch or a through hole; a magnetization direction of the small auxiliary magnet is the same as that of the primary driving magnet.

11. The multi-lens camera module of claim 1, wherein the distance between the primary driving magnet of the first lens module and the neighbouring surface is shorter than the distance between the primary driving magnet of the second lens module and the neighbouring surface.

12. The multi-lens camera module of claim 11, wherein the primary driving magnet of either one of the lens modules is designed with an extended portion extending from the primary driving magnets toward the neighbouring surface; a shape of the extended portion is one of the following: a rectangular body having smaller height, a trapezoid body gradually decreasing in height, a wedged body gradually decreasing both in height and thickness, and a rectangular body having the same height and thickness as other portion of the primary driving magnets.

13. The multi-lens camera module of claim 11, wherein a pattern of projection of the primary driving magnet on a plane defined by the X-axis and the Z-axis includes at least one pair of opposite edges with unequal length, and the difference between the lengths of the paired opposite edges of the primary driving magnet is more than 10%.

14. The multi-lens camera module of claim 11, wherein a pattern of projection of the primary driving magnet on a plane defined by the X-axis and the Y-axis includes at least one pair of opposite edges with unequal length, and the difference between the lengths of the paired opposite edges of the primary driving magnet is more than 10%.

15. The multi-lens camera module of claim 1, wherein the first lens module comprises a small auxiliary magnet located at the side of the first lens module nearby the neighbouring surface; in addition, the first lens module has no secondary driving magnet.

16. The multi-lens camera module of claim 15, wherein a projection of the auxiliary magnet of the first lens module on the neighbouring surface is overlapped with a middle portion of the secondary driving magnet of the second lens module located at the other side of the neighbouring surface.

17. The multi-lens camera module of claim 11, wherein the distance along the X-axis between the primary driving magnet of the first lens module and the neighbouring surface is shorter than the distance along the X-axis between the primary driving magnet of the second lens module and the neighbouring surface; a projection of the primary driving magnet of the first lens module on a plane defined by the X-axis and the Z-axis is partially overlapped with another magnet of the same first lens module located nearby the neighbouring surface.

18. The multi-lens camera module of claim 11, wherein the second lens module is furnished with two secondary driving magnets at the side nearby the neighbouring surface; a covering range of these two secondary driving magnets along the Y-axis exceeds an inner side of the primary driving magnet of the second lens module; the projections of the primary driving magnet and the secondary driving magnet of the second lens module on the neighbouring surface are partially overlapped.

19. The multi-lens camera module of claim 1, wherein the frame is formed with at least one notch space extending downward along the Z-axis from an upper surface of the frame; a bottom area of the notch space is the place at which a damping medium is applied.

* * * * *